US012687701B2

(12) United States Patent　　　　(10) Patent No.:　US 12,687,701 B2
Pan et al.　　　　　　　　　　　　(45) Date of Patent:　　　Jul. 21, 2026

(54) CAMERA OPTICAL LENS

(71) Applicant: AAC OPTICS ( CHANGZHOU ) CO., LTD., Changzhou City (CN)

(72) Inventors: Hongxiang Pan, Changzhou (CN); Shunda Zhou, Changzhou (CN)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 252 days.

(21) Appl. No.: 18/733,613

(22) Filed: Jun. 4, 2024

(65) Prior Publication Data

US 2025/0271642 A1　　Aug. 28, 2025

(30) Foreign Application Priority Data

Feb. 28, 2024　(CN) .......................... 202410224134.5

(51) Int. Cl.
　*G02B 13/00*　　　(2006.01)
　*G02B 9/64*　　　(2006.01)
(52) U.S. Cl.
　CPC ........... *G02B 13/0045* (2013.01); *G02B 9/64* (2013.01)

(58) Field of Classification Search
　CPC .............................. G02B 9/64; G02B 13/0045
　USPC ......................................................... 359/708
　See application file for complete search history.

(56) References Cited

U.S. PATENT DOCUMENTS 11,175,479 B2 * 11/2021 Chen .................. G02B 13/0045
2018/0239115 A1 * 8/2018 Hsu .......................... G02B 9/64

* cited by examiner

*Primary Examiner* — James R Greece
(74) *Attorney, Agent, or Firm* — Wiersch Law Group

(57)　　　　　　　ABSTRACT

The present disclosure relates to optical lenses and discloses a camera optical lens including, from an object side to an image side in sequence: a first lens having a negative refractive power, a second lens having a refractive power, a third lens having a positive refractive power, a fourth lens having a positive refractive power, a fifth lens having a negative refractive power, a sixth lens having a positive refractive power, and a seventh lens having a negative refractive power. The camera optical lens satisfies following conditions: 0≤(R1+R2)/(R1−R2)≤0.50; 110.00≤(FOV*f)/IH≤140.00; −1.70≤f1/f≤1.10; and −3.00≤R5/R6≤−0.50. The camera optical lens in the present disclosure meets a design requirement for the large aperture, ultra-thinness and wide angle.

12 Claims, 12 Drawing Sheets

10

30

40

CAMERA OPTICAL LENS

CROSS-REFERENCE TO RELATED APPLICATION

This application claims the benefit of priority under the Paris Convention to Chinese Patent Applications No. 202410224134.5 filed on Feb. 28, 2024, which is incorporated herein by reference in its entirety.

TECHNICAL FIELD

The present disclosure relates to optical lenses, in particular to a camera optical lens applicable to handheld devices such as smart phones and digital cameras, as well as imaging devices such as monitors, polycarbonate (PC) lenses, and vehicle-mounted lenses.

BACKGROUND

With the emergence of smart phones in recent years, the demand for miniature camera lens is increasing day by day, and miniature camera lens with good imaging quality have become a mainstream in the market dur to reduction in the pixel size of photosensitive devices and the development trend of today's electronic products to be functional, thin, and portable. In order to obtain better imaging quality, a multi-piece lens structure is adopted more. Moreover, with development of technology and increase of diverse demands of users, a seven-piece lens structure gradually appear in lens design under a circumstance that the pixel area of photosensitive devices is shrinking steadily and the requirement of the system for the imaging quality is improving constantly. There is an urgent need for wide-angle camera lenses which have good optical characteristics, small sizes and fully corrected aberrations.

SUMMARY

The present disclosure provides a camera optical lens including, from an object side to an image side in sequence: a first lens having a negative refractive power, a second lens having a refractive power, a third lens having a positive refractive power, a fourth lens having a positive refractive power, a fifth lens having a negative refractive power, a sixth lens having a positive refractive power, and a seventh lens having a negative refractive power; where the camera optical lens satisfies following conditions: $0 \leq (R1+R2)/(R1-R2) \leq 0.50$; $110.00 \leq (FOV*f)/IH \leq 140.00$; $-1.70 \leq f1/f \leq -1.10$; and $-3.00 \leq R5/R6 \leq -0.50$; where R1 denotes a central curvature radius of an object-side surface of the first lens; R2 denotes a central curvature radius of an image-side surface of the first lens; FOV denotes a field of view in a diagonal direction of the camera optical lens; IH denotes an image height of 1.0H of the camera optical lens; f denotes a focal length of the camera optical lens; f1 denotes a focal length of the first lens; R5 denotes a central curvature radius of an object-side surface of the third lens; and R6 denotes a central curvature radius of an image-side surface of the third lens.

As an improvement, the camera optical lens further satisfies the following condition: $0.13 \leq BFL/TTL \leq 0.22$; where BFL denotes an on-axis distance from the seventh lens to an image surface; and TTL denotes a total track length of the camera optical lens.

As an improvement, the fourth lens and the fifth lens are glued together.

As an improvement, the camera optical lens further satisfies the following condition: $v4-v5 \geq 35.00$; where v4 denotes an abbe number of the fourth lens; and v5 denotes an abbe number of the fifth lens.

As an improvement, the object-side surface of the first lens is concave in a paraxial region, the image-side surface of the first lens is concave in the paraxial region, and the camera optical lens further satisfies the following condition: $0.01 \leq d1/TTL \leq 0.04$; where TTL denotes a total track length of the camera optical lens; and d1 denotes an on-axis thickness of the first lens.

As an improvement, an object-side surface of the second lens is concave in a paraxial region, an image-side surface of the second lens is convex in the paraxial region, and the camera optical lens further satisfies following conditions: $-87.96 \leq f2/f \leq 25.91$; $-51.10 \leq (R3+R4)/(R3-R4) \leq 29.91$; and $0.05 \leq d3/TTL \leq 0.30$; where f2 denotes a focal length of the second lens; R3 denotes a central curvature radius of the object-side surface of the second lens; R4 denotes a central curvature radius of the image-side surface of the second lens; d3 denotes an on-axis thickness of the second lens; and TTL denotes a total track length of the camera optical lens.

As an improvement, the object-side surface of the third lens is convex in a paraxial region, the image-side surface of the third lens is convex in the paraxial region, and the camera optical lens further satisfies following conditions: $0.84 \leq f3/f \leq 3.09$; $-0.66 \leq (R5+R6)/(R5-R6) \leq 0.75$; and $0.03 \leq d5/TTL \leq 0.28$; where f3 denotes a focal length of the third lens; d5 denotes an on-axis thickness of the third lens; and TTL denotes a total track length of the camera optical lens.

As an improvement, an object-side surface of the fourth lens is convex in a paraxial region, an image-side surface of the fourth lens is convex in the paraxial region, and the camera optical lens further satisfies following conditions: $0.62 \leq f4/f \leq 2.40$; $0.02 \leq (R7+R8)/(R7-R8) \leq 0.36$; and $0.05 \leq d7/TTL \leq 0.37$; where f4 denotes a focal length of the fourth lens; R7 denotes a central curvature radius of the object-side surface of the fourth lens; R8 denotes a central curvature radius of the image-side surface of the fourth lens; d7 denotes an on-axis thickness of the fourth lens; and TTL denotes a total track length of the camera optical lens.

As an improvement, an object-side surface of the fifth lens is concave in a paraxial region, an image-side surface of the fifth lens is concave in the paraxial region, and the camera optical lens further satisfies following conditions: $-2.61 \leq f5/f \leq -0.66$; $-0.92 \leq (R9+R10)/(R9-R10) \leq -0.31$; and $0 \leq d9/TTL \leq 0.06$; where f5 denotes a focal length of the fifth lens; R9 denotes a central curvature radius of the object-side surface of the fifth lens; R10 denotes a central curvature radius of the image-side surface of the fifth lens; d9 denotes an on-axis thickness of the fifth lens; and TTL denotes a total track length of the camera optical lens.

As an improvement, an object-side surface of the sixth lens is convex in a paraxial region, an image-side surface of the sixth lens is convex in the paraxial region, and the camera optical lens further satisfies following conditions: $0.51 \leq f6/f \leq 2.55$; $0.02 \leq (R11+R12)/(R11-R12) \leq 1.50$; and $0.05 \leq d11/TTL \leq 0.24$; where f6 denotes a focal length of the sixth lens; R11 denotes a central curvature radius of the object-side surface of the sixth lens; R12 denotes a central curvature radius of the image-side surface of the sixth lens; d11 denotes an on-axis thickness of the sixth lens; and TTL denotes a total track length of the camera optical lens.

As an improvement, an object-side surface of the seventh lens is convex in a paraxial region, an image-side surface of the seventh lens is concave in the paraxial region, and the camera optical lens further satisfies following conditions: $-9.52 \leq f7/f \leq -0.88$; $1.42 \leq (R13+R14)/(R13-R14) \leq 14.31$; and $0.01 \leq d13/TTL \leq 0.07$; where f7 denotes a focal length of the seventh lens; R13 denotes a central curvature radius of the object-side surface of the seventh lens; R14 denotes a central curvature radius of the image-side surface of the seventh lens; d13 denotes an on-axis thickness of the seventh lens; and TTL denotes a total track length of the camera optical lens.

As an improvement, the first lens, the second lens, the third lens, the fourth lens, the fifth lens, the sixth lens and the seventh lens are all made of glass materials.

BRIEF DESCRIPTION OF THE DRAWINGS

In order to more clearly illustrate the technical solutions in the embodiments of the present disclosure, the accompanying drawings that need to be used in the embodiments are briefly described below. It is apparent that the drawings in the following description are merely some embodiments of the present disclosure, and for a person of ordinary skill in the art, other drawings may also be obtained according to these drawings without effective efforts.

DETAILED DESCRIPTION OF THE EMBODIMENTS

Figure 1:
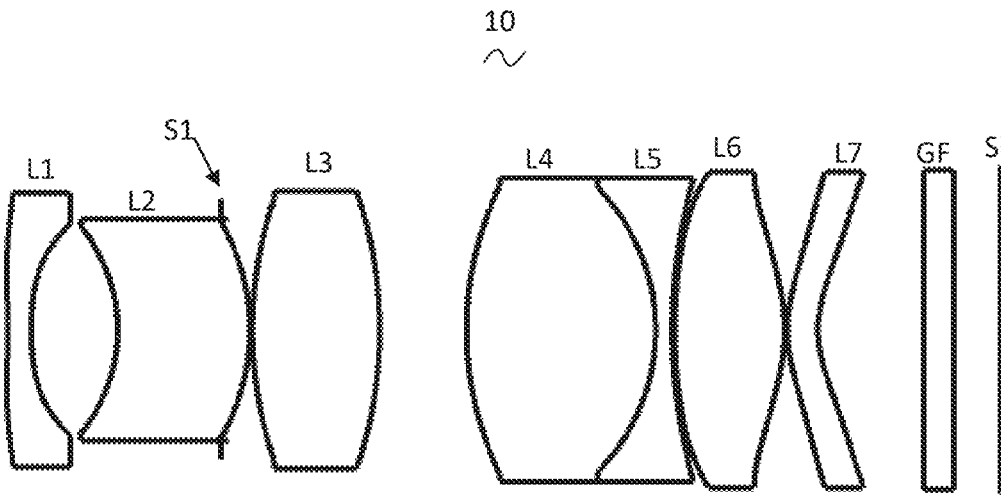
FIG. 1 is a schematic structural diagram of a camera optical lens of a first embodiment of the present disclosure.

In order to make the objects, technical solutions and advantages of the present disclosure clearer, various embodiments of the present disclosure will be described in detail below with reference to the accompanying drawings. Persons of ordinary skill in the art can understand that in the various embodiments of the present disclosure, many technical details have been proposed in order to enable the reader to better understand the present disclosure. However, the technical solutions claimed in the present disclosure can also be realized even without these technical details and various variations and modifications based on the following various embodiments.

Referring to the accompanying drawings, the present disclosure provides camera optical lenses 10, 20, 30, 40, 50. FIGS. 1, 5, 9, 13, 17 respectively show the camera optical lenses 10, 20, 30, 40, 50, each of which includes seven lenses. Specifically, from an object side to an image side, the camera optical lens includes in sequence: a first lens L1, a second lens L2, an aperture S1, a third lens L3, a fourth lens L4, a fifth lens L5, a sixth lens L6 and a seventh lens L7. An optical element such as an optical filter GF may be provided between the seventh lens L7 and an image surface Si.

The first lens L1 is made of glass material, the second lens L2 is made of glass material, the third lens L3 is made of glass material, the fourth lens L4 is made of glass material, the fifth lens L5 is made of glass material, the sixth lens L6 is made of glass material, the seventh lens L7 is made of glass material. Each of the lenses may also be made of other material.

Object-side surfaces and image-side surfaces of the second lens L2, the third lens L3, the fourth lens L4, and the fifth lens L5 are all spherical surfaces, and object-side surfaces and image-side surfaces of the first lens L1, the sixth lens L6, and the seventh lens L7 are all aspheric surfaces.

A central curvature radius of the object-side surface of the first lens L1 is defined as R1, and a central curvature radius of an image-side surface of the first lens L1 is defined as R2. The camera optical lens satisfies the following condition: $0 \leq (R1+R2)/(R1-R2) \leq 0.50$, which specifies a shape of the first lens L1. Within this range, a deflection degree of lights passing through the lens can be alleviated, and the aberration can be effectively reduced.

A field of view in a diagonal direction of the camera optical lens is defined as FOV, a focal length of the camera optical lens is defined as f, and an image height of 1.0H of the camera optical lens is defined as IH. The camera optical lens satisfies the following condition: $110.00 \leq (FOV*f)/IH \leq 140.00$. Within this range, the camera optical lens allows for both a large field of view and a long focal length so as to realize medium- and long-distance imaging.

A focal length of the first lens L1 is defined as f1. The camera optical lens satisfies the following condition: $-1.70 \leq f1/f \leq -1.10$, which specifies a ratio of the focal length of the first lens L1 and the focal length of the camera optical lens. By reasonably distributing the focal length of the camera optical lens, an amount of field curvature of the system can be effectively balanced so that a field curvature offset of a center field of view is less than 0.02 mm.

A central curvature radius of the object-side surface of the third lens L3 is defined as R5, and a central curvature radius of the image-side surface of the third lens L3 is defined as R6. The camera optical lens satisfies the following condition: −3.00≤R5/R6≤−0.50, which specifies a shape of the third lens L3. Within this range, a deflection degree of lights passing through the lens can be alleviated, and the aberration can be effectively reduced.

When the above conditions are satisfied, the camera optical lens 10, 20, 30, 40, 50 meets the design requirement for large aperture, wide angle and ultra-thinness while having good optical imaging performance. Based on the characteristics of the camera optical lens 10, 20, 30, 40, 50, the camera optical lens 10, 20, 30, 40, 50 is particularly applicable to mobile camera lens assemblies and WEB camera lenses composed of such camera elements as CCD and CMOS for high pixels.

Based on the above conditions and the functions that can be realized, the characteristics of each lens are further refined as follows.

An on-axis distance from the seventh lens L7 to the image surface is defined as BFL, and a total track length of the camera optical lens is defined as TTL. The camera optical lens satisfies the following condition: 0.13≤BFL/TTL≤0.22, which specifies a range of the ratio of a back focal length and the total track length of the camera optical lens. On the basis of realizing miniaturization, a long back focal length is conducive to the assembly of the module, and a short total length enables a compact structure, reduces the sensitivity of the lens to MTF, improves the production yields, and reduces the production costs.

The fourth lens L4 and the fifth lens L5 are glued together. The overall volume of the camera optical lens can be reduced through the gluing setup, in addition, the two lenses form a whole structure through the gluing setup, and the installation of the two lenses can be accomplished by placing once when assembling the optical module.

An abbe number of the fourth lens L4 is defined as v4, and an abbe number of the fifth lens L5 is defined as v5. The camera optical lens satisfies the following condition: v4−v5≥35.00, which specifies a difference between the abbe numbers of the glued lenses. Within this range, the material properties can be efficiently assigned and the chromatic aberration can be efficiently corrected, so that the chromatic aberration LC satisfies a condition of |LC|≤6.0 μm.

The object-side surface of the first lens L1 is concave in the paraxial region, the image-side surface of the first lens L1 is concave in the paraxial region, and the first lens L1 has a negative refractive power. The object-side surface and image-side surface of the first lens L1 may also be set to other concave and convex distributions.

An on-axis thickness of the first lens L1 is defined as d1, and the camera optical lens satisfies the following condition: 0.01≤d1/TTL≤0.04. Within this range, it is conducive to realizing ultra-thin lenses. Preferably, the camera optical lens satisfies the following condition: 0.01≤d1/TTL≤0.03.

The object-side surface of the second lens L2 is concave in the paraxial region, the image-side surface of the second lens L2 is convex in the paraxial region, and the second lens L2 has a positive refractive power or a negative refractive power. The object-side surface and image-side surface of the second lens L2 may also be set to other concave and convex distributions.

A focal length of the second lens L2 is defined as f2, and the camera optical lens satisfies the following condition:

−87.96≤f2/f≤25.91. By controlling the refractive power of the second lens L2 in a reasonable range, it is conducive to correcting the aberration of the optical system. Preferably, the camera optical lens satisfies the following condition: −54.97≤f2/f≤20.73.

A central curvature radius of the object-side surface of the second lens L2 is defined as R3, and a central curvature radius of the image-side surface of the second lens L2 is defined as R4. The camera optical lens satisfies the following condition: −51.10≤(R3+R4)/(R3−R4)≤29.91. By reasonably controlling the shape of the second lens L2, the second lens L2 can efficiently correct the spherical aberration of the system. Preferably, the camera optical lens satisfies the following condition: −31.94≤(R3+R4)/(R3−R4) ≤23.93.

An on-axis thickness of the second lens L2 is defined as d3, and the camera optical lens satisfies the following condition: 0.05≤d3/TTL≤0.30. Within this range, it is conducive to realizing ultra-thin lenses. Preferably, the camera optical lens satisfies the following condition: 0.09≤d3/TTL≤0.24.

The object-side surface of the third lens L3 is convex in the paraxial region, the image-side surface of the third lens L3 is convex in the paraxial region, and the third lens L3 has a positive refractive power. The object-side surface and image-side surface of the third lens L3 may also be set to other concave and convex distributions.

A focal length of the third lens L3 is defined as f3, and the camera optical lens satisfies the following condition: 0.84≤f3/f≤3.09. With reasonable distribution of the refractive power, the system has better imaging quality and lower sensitivity. Preferably, the camera optical lens satisfies the following condition: 1.34≤β/f≤2.47.

A central curvature radius of the object-side surface of the third lens L3 is defined as R5, and a central curvature radius of the image-side surface of the third lens L3 is defined as R6. The camera optical lens satisfies the following condition: −0.66≤(R5+R6)/(R5−R6)≤0.75, which specifies a shape of the third lens L3. Within this range, it is conducive to correcting on-axis chromatic aberration with the development into the direction of ultra-thin and wide-angle lenses. Preferably, the camera optical lens satisfies the following condition: −0.41≤(R5+R6)/(R5−R6)≤0.60.

An on-axis thickness of the third lens L3 is defined as d5, and the camera optical lens satisfies the following condition: 0.03≤d5/TTL≤0.28. Within this range, it is conducive to realizing ultra-thin lenses. Preferably, the camera optical lens satisfies the following condition: 0.04≤d5/TTL≤0.22.

The object-side surface of the fourth lens L4 is convex in the paraxial region, the image-side surface of the fourth lens L4 is convex in the paraxial region, and the fourth lens L4 has a positive refractive power. The object-side surface and image-side surface of the fourth lens L4 may also be set to other concave and convex distributions.

A focal length of the fourth lens L4 is defined as f4, and the camera optical lens satisfies the following condition: 0.62≤f4/f≤2.40. With reasonable distribution of the refractive power, the system has better imaging quality and lower sensitivity. Preferably, the camera optical lens satisfies the following condition: 1.00≤f4/f≤1.92.

A central curvature radius of the object-side surface of the fourth lens L4 is defined as R7, and a central curvature radius of the image-side surface of the fourth lens L4 is defined as R8. The camera optical lens satisfies the following condition: 0.02≤(R7+R8)/(R7−R8)≤0.36, which specifies a shape of the fourth lens L4. Within this range, it is conducive to smooth transition of the light and improving the imaging quality. Preferably, the camera optical lens satisfies the following condition: 0.03≤(R7+R8)/(R7−R8) ≤0.29.

An on-axis thickness of the fourth lens L4 is defined as d7, and the camera optical lens satisfies the following condition: 0.05≤d7/TTL≤0.37. Within this range, it is conducive to realizing ultra-thin lenses. Preferably, the camera optical lens satisfies the following condition: 0.07≤d7/TTL≤0.29.

The object-side surface of the fifth lens L5 is concave in the paraxial region, the image-side surface of the fifth lens L5 is concave in the paraxial region, and the fifth lens L5 has a negative refractive power. The object-side surface and image-side surface of the fifth lens L5 may also be set to other concave and convex distributions.

A focal length of the fifth lens L5 is defined as f5, and the camera optical lens satisfies the following condition: −2.61≤f5/f≤−0.66. The definition of the fifth lens L5 can effectively make the light angle of the camera optical lens flat and reduces the tolerance sensitivity. Preferably, the camera optical lens satisfies the following condition: −1.63≤f5/f≤−0.83.

A central curvature radius of the object-side surface of the fifth lens L5 is defined as R9, and a central curvature radius of the image-side surface of the fifth lens L5 is defined as R10. The camera optical lens satisfies the following condition: −0.92≤(R9+R10)/(R9−R10)≤−0.31, which specifies a shape of the fifth lens L5. Within this range, it is conducive to correcting the astigmatism and distortion of the camera optical lens.

An on-axis thickness of the fifth lens L5 is defined as d9, and the camera optical lens satisfies the following condition: 0≤d9/TTL≤0.06. Within this range, it is conducive to realizing ultra-thin lenses. Preferably, the camera optical lens satisfies the following condition: 0≤d9/TTL≤0.05.

The object-side surface of the sixth lens L6 is convex in the paraxial region, the image-side surface of the sixth lens L6 is convex in the paraxial region, and the sixth lens L6 has a positive refractive power. The object-side surface and image-side surface of the sixth lens L6 may also be set to other concave and convex distributions.

A focal length of the camera optical lens is defined as f, a focal length of the sixth lens L6 is defined as f6, and the camera optical lens satisfies the following condition: −0.51≤f6/f≤2.55. With reasonable distribution of the refractive power, the system has better imaging quality and lower sensitivity. Preferably, the camera optical lens satisfies the following condition: 0.81≤f6/f≤2.04.

A central curvature radius of the object-side surface of the sixth lens L6 is defined as R11, and a central curvature radius of the image-side surface of the sixth lens L6 is defined as R12. The camera optical lens satisfies the following condition: 0.02≤(R11+R12)/(R11−R12)≤1.50, which specifies a shape of the sixth lens L6. Within this range, a development towards ultra-thin and wide-angle lenses would facilitate correcting a problem like the off-axis aberration. Preferably, the camera optical lens satisfies the following condition: 0.03≤(R11+R12)/(R11−R12)≤1.20.

An on-axis thickness of the sixth lens L6 is defined as d11, and the camera optical lens satisfies the following condition: 0.05≤d11/TTL≤0.24. Within this range, it is conducive to realizing ultra-thin lenses. Preferably, the camera optical lens satisfies the following condition: 0.08≤d11/TTL≤0.19.

The object-side surface of the seventh lens L7 is convex in the paraxial region, the image-side surface of the seventh lens L7 is concave in the paraxial region, and the seventh lens L7 has a negative refractive power. The object-side surface and image-side surface of the seventh lens L7 may also be set to other concave and convex distributions.

A focal length of the seventh lens L7 is defined as f7, and the camera optical lens satisfies the following condition: −9.52≤f7/f≤−0.88, which specifies a ratio between the focal length of the last lens and the total focal length of the camera optical lens. With the reasonable distribution of the refractive power of the system, it is conducive to receiving light and ensuring the light quantity. Preferably, the camera optical lens satisfies the following condition: −5.95≤f7/f≤−1.10.

A central curvature radius of the object-side surface of the seventh lens L7 is defined as R13, and a central curvature radius of the image-side surface of the seventh lens L7 is defined as R14. The camera optical lens satisfies the following condition: 1.42≤(R13+R14)/(R13−R14)≤14.31, which specifies a shape of the seventh lens L7. Within this range, a development towards ultra-thin and wide-angle lenses would facilitate correcting a problem like the off-axis aberration. Preferably, the camera optical lens satisfies the following condition: 2.27≤(R13+R14)/(R13−R14)≤11.45.

An on-axis thickness of the seventh lens L7 is defined as d13, and the camera optical lens satisfies the following condition: 0.01≤d13/TTL≤0.07. Within this range, it is conducive to realizing ultra-thin lenses. Preferably, the camera optical lens satisfies the following condition: 0.01≤d13/TTL≤0.06.

In addition, the camera optical lens further satisfies the following condition: TTL/IH≤6.49, which is conducive to realizing ultra-thin lenses. Preferably, the camera optical lens satisfies the following condition: TTL/IH≤6.31.

The field of view FOV is greater than or equal to 98.88°, so as to realize wide-angle lenses.

An F number FNO of the camera optical lens is less than or equal to 1.65, so as to achieve a large aperture and good imaging performance of the camera optical lens.

In the following, examples will be used to describe the camera optical lens of the present disclosure. The symbols recorded in each example will be described as follows. The focal length, on-axis distance, central curvature radius, on-axis thickness, inflexion point position, and arrest point position are all in units of mm.

TTL refers to a total track length (an on-axis distance from an object-side surface of the first lens L1 to an image surface Si) in units of mm.

F number FNO refers to a ratio of an effective focal length of the camera optical lens to an entrance pupil diameter.

Next, the technical solutions of the present disclosure are specified in five embodiments, and a comparative embodiment is provided as a reference indicating that the technical effect of the present disclosure cannot be realized when the scope of the above condition is exceeded.

Embodiment 1

The design data of the camera optical lens 10 in the first embodiment of the present disclosure are shown in Table 1 and Table 2.

TABLE 1

| | R | d | | nd | | vd |
|---|---|---|---|---|---|---|
| S1 | ∞ | d0= | −6.424 | | | |
| R1 | −16.023 | d1= | 0.700 | nd1 | 1.7738 | v1 | 47.17 |
| R2 | 12.132 | d2= | 2.610 | | | |
| R3 | −5.645 | d3= | 3.994 | nd2 | 1.4970 | v2 | 81.59 |
| R4 | −7.421 | d4= | 0.067 | | | |
| R5 | 13.942 | d5= | 3.843 | nd3 | 1.6131 | v3 | 60.61 |
| R6 | −14.861 | d6= | 2.623 | | | |
| R7 | 11.429 | d7= | 5.700 | nd4 | 1.4970 | v4 | 81.59 |
| R8 | −7.000 | d8= | 0.000 | | | |
| R9 | −7.000 | d9= | 0.500 | nd5 | 1.7283 | v5 | 28.31 |
| R10 | 19.000 | d10= | 0.080 | | | |
| R11 | 22.062 | d11= | 3.312 | nd6 | 1.5831 | v6 | 59.46 |
| R12 | −6.626 | d12= | 0.080 | | | |
| R13 | 4.799 | d13= | 0.919 | nd7 | 1.8514 | v7 | 40.07 |
| R14 | 3.587 | d14= | 3.200 | | | |
| R15 | ∞ | d15= | 0.900 | ndg | 1.5168 | vg | 64.21 |
| R16 | ∞ | d16= | 1.425 | | | |

In the table, meanings of various symbols will be described as follows:

S1: aperture;

R: curvature radius at a center of an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R15: central curvature radius of an object-side surface of the optical filter GF;

R16: central curvature radius of an image-side surface of the optical filter GF;

d: on-axis thickness of a lens, or an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d1 1: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the optical filter GF;

d15: on-axis thickness of the optical filter GF;

d16: on-axis distance from the image-side surface of the optical filter GF to the image surface Si;

nd: refractive index of a d line (the d line is green light with a wavelength of 555 nm);

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

nd7: refractive index of the d line of the seventh lens L7;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

vg: abbe number of the optical filter GF.

Table 2 shows aspherical surface data of the camera optical lens 10 in the first embodiment of the present disclosure.

TABLE 2

| | Conic coefficient | Aspheric surface coefficients | | | | |
|---|---|---|---|---|---|---|
| | k | A4 | A6 | A8 | A10 | A12 |
| R1 | −2.6508E+01 | 7.3873E−03 | −9.7626E−04 | 9.0530E−05 | −5.6111E−06 | 2.1119E−07 |
| R2 | −3.3244E+01 | 1.1392E−02 | −7.9261E−04 | −3.9574E−05 | 2.3133E−05 | −2.9773E−06 |
| R11 | 5.4548E−01 | 1.2602E−03 | −9.1271E−05 | 5.3100E−06 | −1.8663E−07 | 4.4992E−09 |
| R12 | −4.0285E+00 | 1.4110E−03 | −4.9707E−05 | −1.8127E−06 | 3.0164E−07 | −1.1068E−08 |
| R13 | −9.4302E−01 | −7.0411E−03 | 5.2464E−04 | −3.6688E−05 | 1.7681E−06 | −4.6739E−08 |
| R14 | −3.9032E+00 | −4.1430E−03 | 4.0329E−04 | −3.0499E−05 | 1.4832E−06 | −3.7018E−08 |

| | Conic coefficient | Aspheric surface coefficients | |
|---|---|---|---|
| | k | A14 | A16 |
| R1 | −2.6508E+01 | −4.2039E−09 | 3.1717E−11 |
| R2 | −3.3244E+01 | 1.7494E−07 | −3.9969E−09 |
| R11 | 5.4548E−01 | −6.4473E−11 | 3.4925E−13 |
| R12 | −4.0285E+00 | 1.6307E−10 | −8.6158E−13 |
| R13 | −9.4302E−01 | 5.5099E−10 | −1.5478E−12 |
| R14 | −3.9032E+00 | 3.3935E−10 | 6.4261E−13 |

For convenience, an aspheric surface of each lens surface uses the aspheric surfaces shown in the above formula (1). However, the present disclosure is not limited to the aspherical polynomials form shown in the formula (1).

$$z = \left(cr^2\right)/\left\{1 + \left[1 - (k+1)\left(c^2 r^2\right)\right]^{1/2}\right\} + A4r^4 + \tag{1}$$
$$A6r^6 + A8r^8 + A10r^{10} + A12r^{12} + A14r^{14} + A16r^{16}$$

Here, K is a conic coefficient, and A4, A6, A8, A10, A12, A14, A16, A18 and A20 are aspheric surface coefficients, c denotes a curvature radius at a center of an optical surface, r denotes a vertical distance between a point on an aspheric curve and an optical axis, and z denotes a depth of a aspheric surface (i.e. a vertical distance between the point having a distance of x from the optical axis on an aspheric surface and a plane tangent to a vertex on the optical axis of an aspheric surface).

Figure 2:
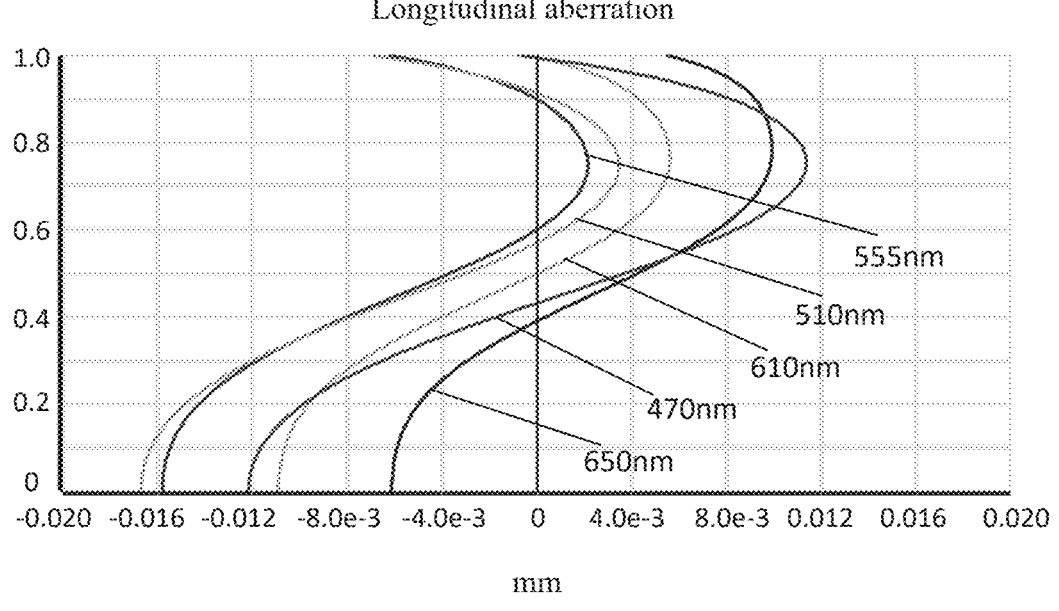
FIG. 2 is a schematic diagram of the longitudinal aberration of the camera optical lens shown in FIG. 1.
Figure 3:
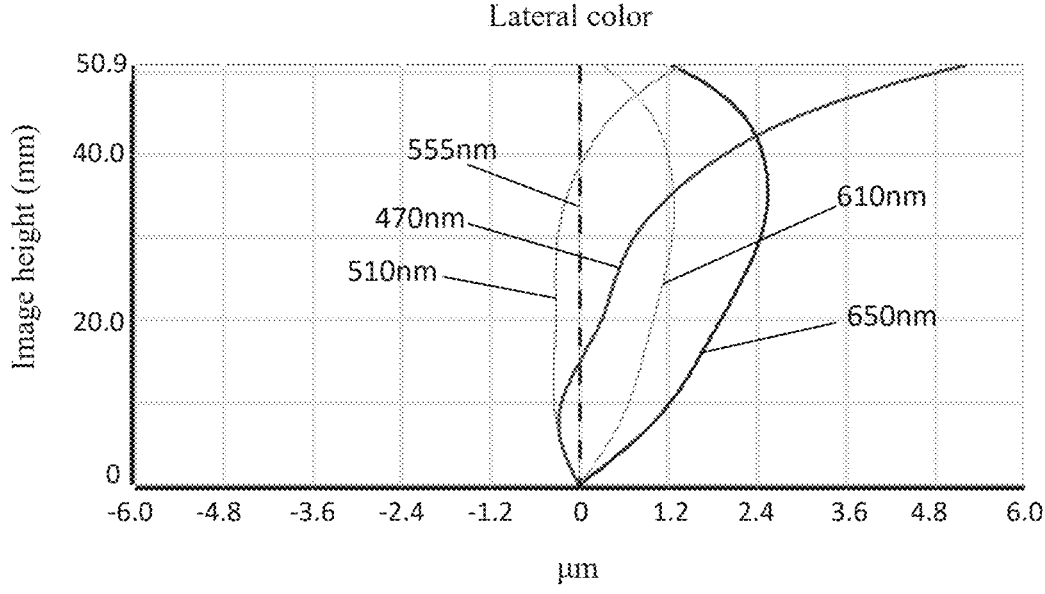
FIG. 3 is a schematic diagram of the lateral color of the camera optical lens shown in FIG. 1.
Figure 4:
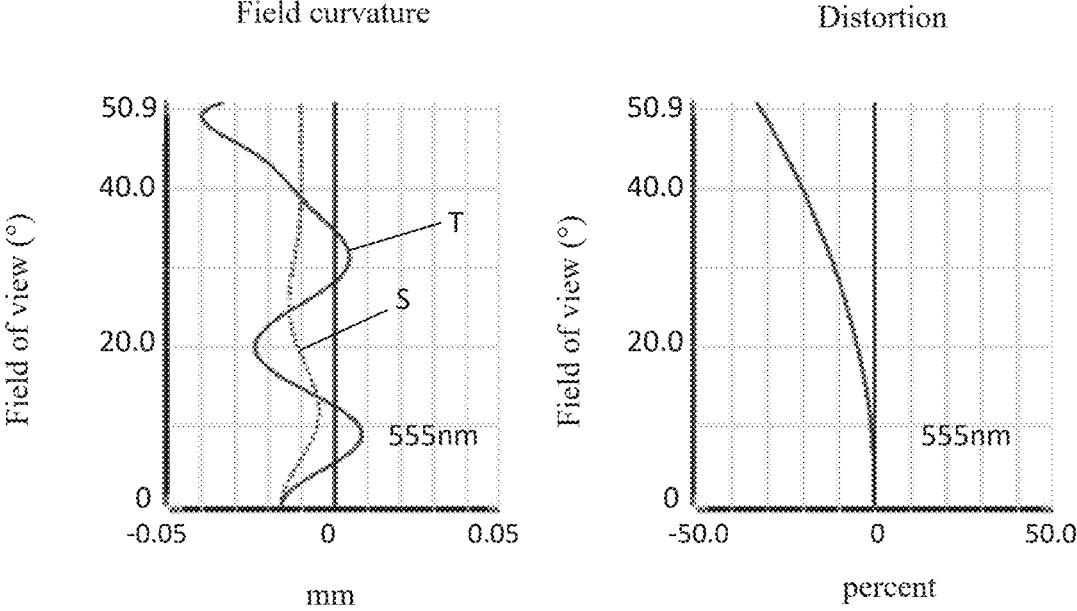
FIG. 4 is a schematic diagram of the field curvature and distortion of the camera optical lens shown in FIG. 1.

FIG. 2 and FIG. 3 show a longitudinal aberration and a lateral color of light with wavelengths of 650 nm, 610 nm, 555 nm, 510 nm and 470 nm after passing the camera optical lens 10 in Embodiment 1. FIG. 4 illustrates a schematic diagram of a field curvature and a distortion of light with a wavelength of 555 nm after passing the camera optical lens Table 3 and Table 4 show design data of the camera optical lens 20 in Embodiment 2 of the present disclosure.

TABLE 3

| | R | d | nd | | vd | |
|---|---|---|---|---|---|---|
| S1 | ∞ | d0= | −6.232 | | | |
| R1 | −32.892 | d1= | 0.416 | nd1 | 1.7738 | v1 | 47.17 |
| R2 | 10.971 | d2= | 1.972 | | | |
| R3 | −6.886 | d3= | 4.566 | nd2 | 1.4970 | v2 | 81.59 |
| R4 | −7.447 | d4= | 0.050 | | | |
| R5 | 9.717 | d5= | 4.500 | nd3 | 1.6131 | v3 | 60.61 |
| R6 | −15.693 | d6= | 1.463 | | | |
| R7 | 7.524 | d7= | 2.720 | nd4 | 1.4970 | v4 | 81.59 |
| R8 | −7.000 | d8= | 0.000 | | | |
| R9 | −7.000 | d9= | 0.939 | nd5 | 1.7283 | v5 | 28.31 |
| R10 | 19.000 | d10= | 0.381 | | | |
| R11 | 5187.223 | d11= | 2.951 | nd6 | 1.5831 | v6 | 59.46 |
| R12 | −6.196 | d12= | 0.800 | | | |
| R13 | 4.801 | d13= | 0.494 | nd7 | 1.8514 | v7 | 40.07 |
| R14 | 2.964 | d14= | 1.990 | | | |
| R15 | ∞ | d15= | 0.900 | ndg | 1.5168 | vg | 64.21 |
| R16 | ∞ | d16= | 0.288 | | | |

Table 4 shows aspherical surface data of each lens of the camera optical lens 20 in Embodiment 2 of the present disclosure.

TABLE 4

| | Conic coefficient k | Aspheric surface coefficients | | | | |
|---|---|---|---|---|---|---|
| | | A4 | A6 | A8 | A10 | A12 |
| R1 | 5.7849E+01 | 7.1023E−03 | −9.7598E−04 | 9.1746E−05 | −5.6632E−06 | 2.1377E−07 |
| R2 | −4.9607E+00 | 8.4447E−03 | −6.4118E−04 | −3.7590E−05 | 2.2297E−05 | −3.1361E−06 |
| R11 | 1.9131E−03 | −4.9596E−05 | 3.3590E−06 | −1.3566E−07 | −4.6087E−09 | 5.5590E−10 |
| R12 | −1.7843E+01 | 2.4693E−03 | 9.4129E−05 | −3.1533E−06 | 5.8728E−08 | 2.9276E−09 |
| R13 | −3.7805E+00 | −6.7012E−03 | 6.9499E−04 | −4.3513E−05 | 1.7468E−06 | −4.1743E−08 |
| R14 | −4.2436E+00 | −5.5354E−03 | 5.2869E−04 | −3.3164E−05 | 1.3355E−06 | −3.2906E−08 |

| | Conic coefficient k | Aspheric surface coefficients | |
|---|---|---|---|
| | | A14 | A16 |
| R1 | 5.7849E+01 | −4.3503E−09 | 3.8291E−11 |
| R2 | −4.9607E+00 | 2.0664E−07 | −5.4356E−09 |
| R11 | 1.9131E−03 | −1.3471E−11 | 0.0000E+00 |
| R12 | −1.7843E+01 | −4.7868E−11 | −6.7426E−12 |
| R13 | −3.7805E+00 | 5.6335E−10 | −4.0771E−12 |
| R14 | −4.2436E+00 | 4.8261E−10 | −4.1899E−12 |

10 in Embodiment 1. A field curvature S in FIG. 4 is a field curvature in a sagittal direction, and T is a field curvature in a tangential direction.

In this embodiment, an entrance pupil diameter (ENPD) of the camera optical lens 10 is 3.788 mm, an image height (IH) of 1.0H is 5.139 mm, and a field of view (FOV) in a diagonal direction is 101.69°. Thus, the camera optical lens 10 meets the design requirement for large aperture, wide angle and ultra-thinness. Its on-axis and off-axis chromatic aberrations are sufficiently corrected, thereby achieving excellent optical performance.

Embodiment 2

The meaning of symbols of Embodiment 2 is the same as that of Embodiment 1.

Figure 5:
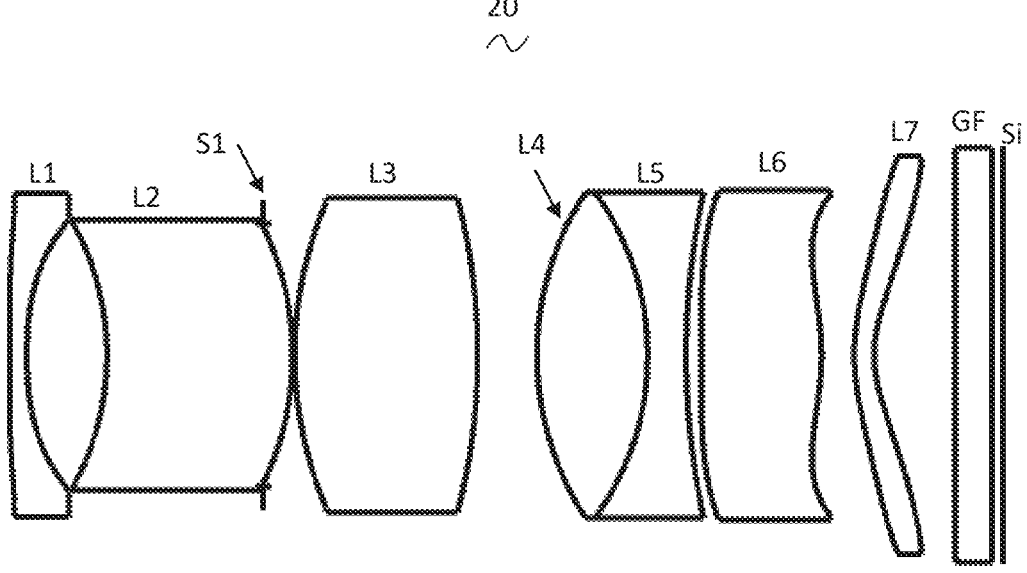
FIG. 5 is a schematic structural diagram of a camera optical lens of a second embodiment of the present disclosure.

FIG. 5 shows a camera optical lens 20 in Embodiment 2 of the present disclosure. The second lens L2 has a positive refractive power.

Figure 6:
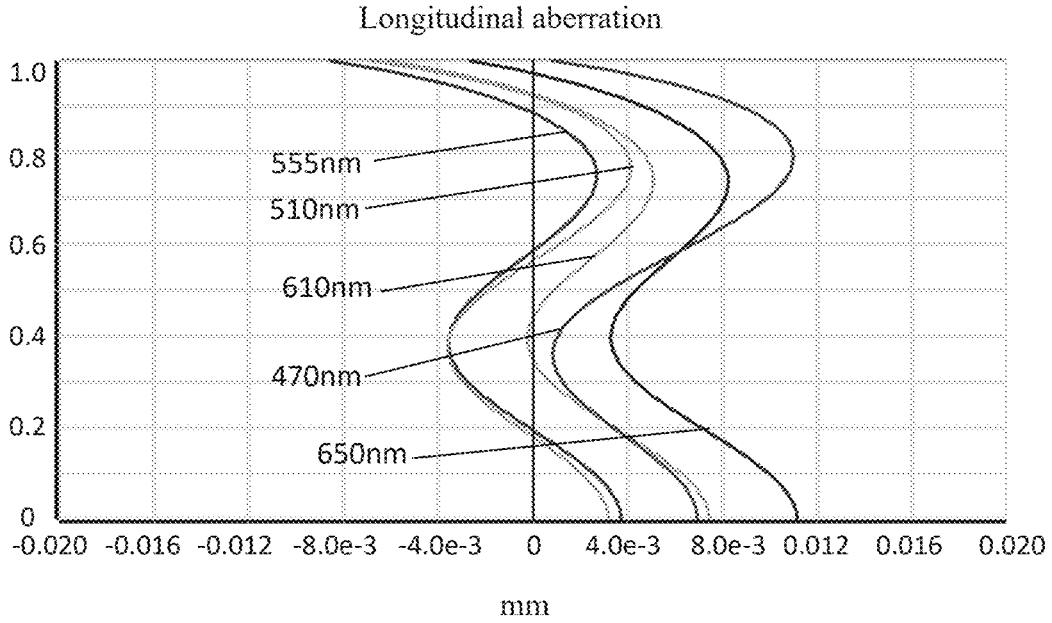
FIG. 6 is a schematic diagram of the longitudinal aberration of the camera optical lens shown in FIG. 5.
Figure 7:
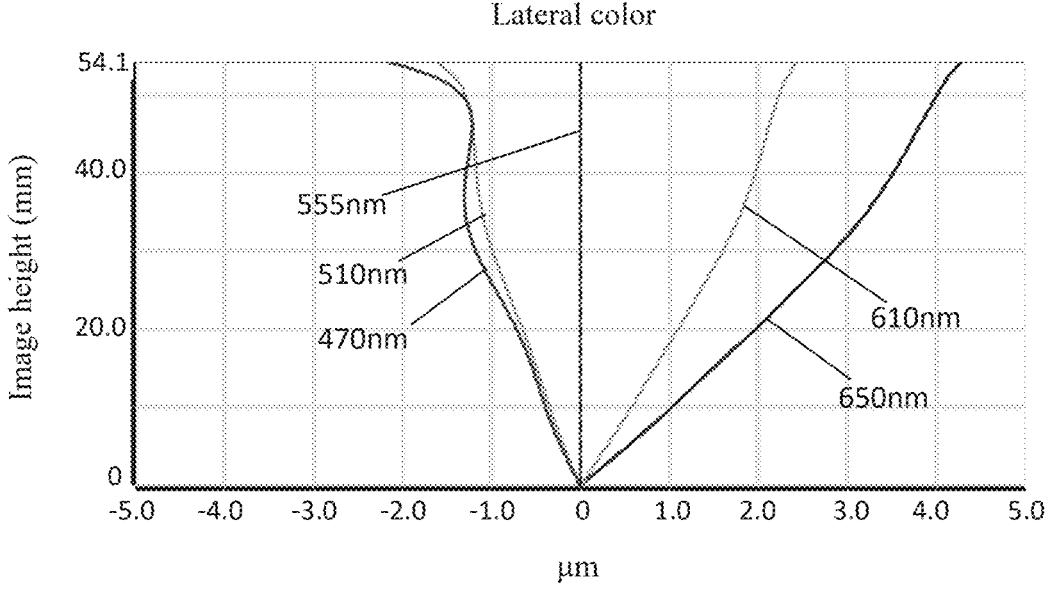
FIG. 7 is a schematic diagram of the lateral color of the camera optical lens shown in FIG. 5.
Figure 8:
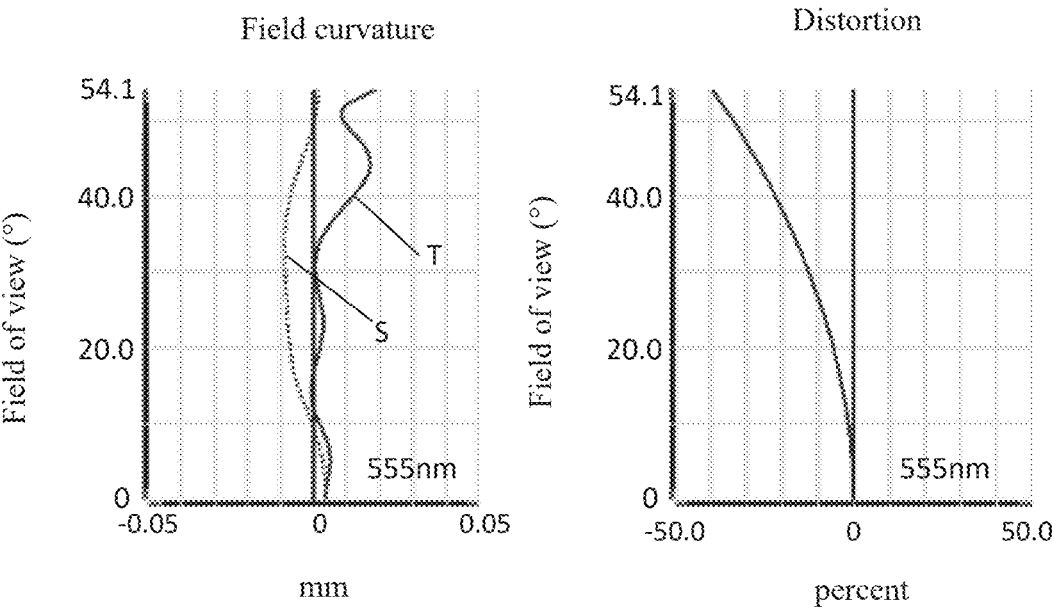
FIG. 8 is a schematic diagram of the field curvature and distortion of the camera optical lens shown in FIG. 5.

FIG. 6 and FIG. 7 show a longitudinal aberration and a lateral color of light with wavelengths of 650 nm, 610 nm, 555 nm, 510 nm and 470 nm after passing the camera optical lens 20 in Embodiment 2. FIG. 8 illustrates a schematic diagram of a field curvature and a distortion of light with a wavelength of 555 nm after passing the camera optical lens 20 in Embodiment 2. A field curvature S in FIG. 8 is a field curvature in a sagittal direction, and T is a field curvature in a tangential direction.

In this embodiment, an entrance pupil diameter (ENPD) of the camera optical lens 20 is 3.786 mm, an image height (IH) of 1.0H is 5.210 mm, and a field of view (FOV) in a diagonal direction is 108.21°. Thus, the camera optical lens 20 meets the design requirement for large aperture, wide angle and ultra-thinness. Its on-axis and off-axis chromatic aberrations are sufficiently corrected, thereby achieving excellent optical performance.

Embodiment 3

The meaning of symbols of Embodiment 3 is the same as that of Embodiment 1.

Figure 9:
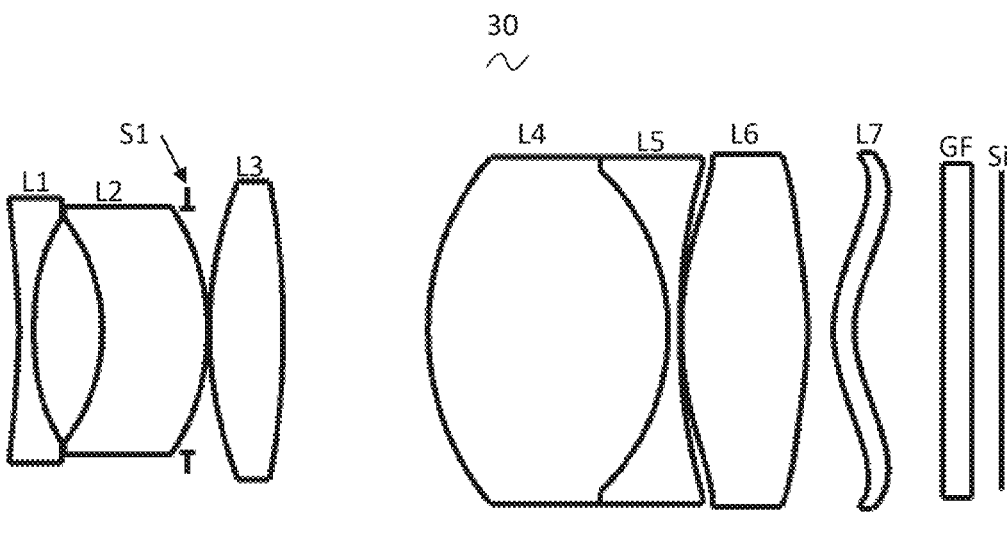
FIG. 9 is a schematic structural diagram of a camera optical lens of a third embodiment of the present disclosure.

FIG. 9 shows a camera optical lens 30 in Embodiment 3 of the present disclosure.

Table 5 and Table 6 show design data of the camera optical lens 30 in Embodiment 3 of the present disclosure.

TABLE 5

| | R | d | | nd | | vd |
|---|---|---|---|---|---|---|
| S1 | ∞ | d0= | −5.238 | | | |
| R1 | −12.177 | d1= | 0.459 | nd1 | 1.7738 | v1 47.17 |
| R2 | 12.175 | d2= | 2.139 | | | |
| R3 | −5.734 | d3= | 3.283 | nd2 | 1.4970 | v2 81.59 |
| R4 | −7.091 | d4= | 0.050 | | | |
| R5 | 12.423 | d5= | 2.303 | nd3 | 1.6131 | v3 60.61 |
| R6 | −24.747 | d6= | 4.500 | | | |
| R7 | 8.445 | d7= | 7.477 | nd4 | 1.4970 | v4 81.59 |
| R8 | −7.000 | d8= | 0.000 | | | |
| R9 | −7.000 | d9= | 0.360 | nd5 | 1.7283 | v5 28.31 |
| R10 | 19.000 | d10= | 0.056 | | | |
| R11 | 11.240 | d11= | 3.921 | nd6 | 1.5831 | v6 59.46 |
| R12 | −10.524 | d12= | 0.800 | | | |
| R13 | 4.084 | d13= | 0.655 | nd7 | 1.8514 | v7 40.07 |
| R14 | 3.309 | d14= | 2.754 | | | |
| R15 | ∞ | d15= | 0.900 | ndg | 1.5168 | vg 64.21 |
| R16 | ∞ | d16= | 0.949 | | | |

Table 6 shows aspherical surface data of each lens of the camera optical lens 30 in Embodiment 3 of the present disclosure.

TABLE 6

| | Conic coefficient k | Aspheric surface coefficients A4 | A6 | A8 | A10 | A12 |
|---|---|---|---|---|---|---|
| R1 | 2.1903E+00 | 6.3257E−03 | −9.8208E−04 | 1.0373E−04 | −6.4862E−06 | 2.0725E−07 |
| R2 | −1.4695E+00 | 6.5880E−03 | −6.8562E−04 | −2.3205E−05 | 2.0334E−05 | −2.7899E−06 |
| R11 | −9.3975E+00 | 1.2339E−03 | −8.3264E−05 | 4.7342E−06 | −2.5647E−07 | 7.7170E−09 |
| R12 | −3.0514E+00 | 1.8348E−03 | −1.9236E−05 | −3.5781E−06 | 1.9387E−07 | −6.0264E−09 |
| R13 | −1.7056E+00 | −6.7283E−03 | 6.1334E−04 | −3.8976E−05 | 1.5488E−06 | −4.1280E−08 |
| R14 | −3.2312E+00 | −5.1016E−03 | 4.8689E−04 | −3.3914E−05 | 1.3876E−06 | −3.5274E−08 |

| | Conic coefficient k | Aspheric surface coefficients A14 | A16 |
|---|---|---|---|
| R1 | 2.1903E+00 | −1.8694E−09 | −3.3106E−11 |
| R2 | −1.4695E+00 | 1.6890E−07 | −3.9470E−09 |
| R11 | −9.3975E+00 | −1.2496E−10 | 1.0693E−12 |
| R12 | −3.0514E+00 | 1.1212E−10 | −8.2573E−13 |
| R13 | −1.7056E+00 | 6.7862E−10 | −5.3004E−12 |
| R14 | −3.2312E+00 | 5.2358E−10 | −3.6088E−12 |

Figure 10:
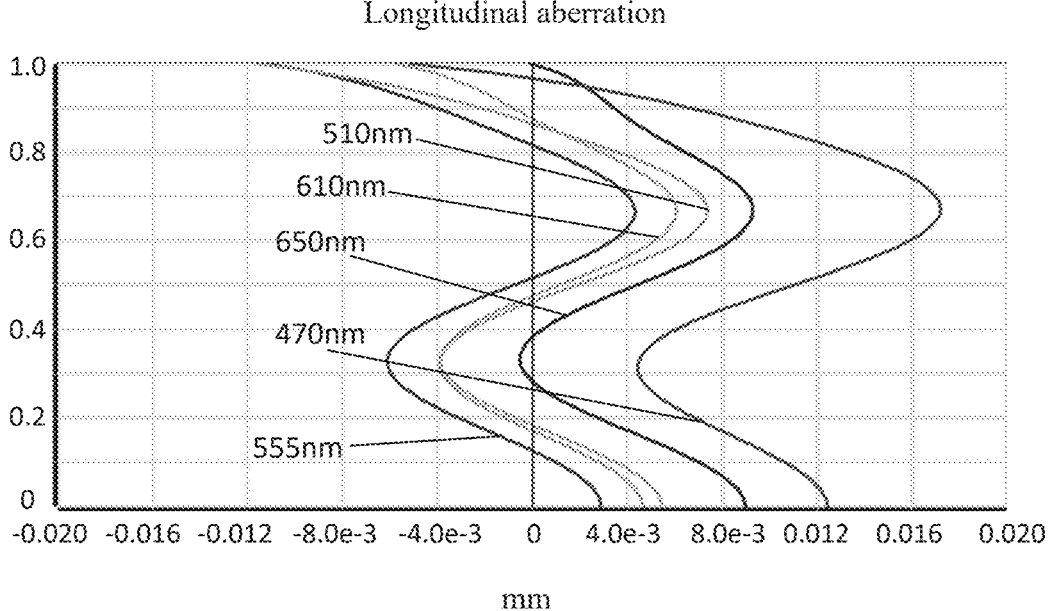
FIG. 10 is a schematic diagram of the longitudinal aberration of the camera optical lens shown in FIG. 9.
Figure 11:
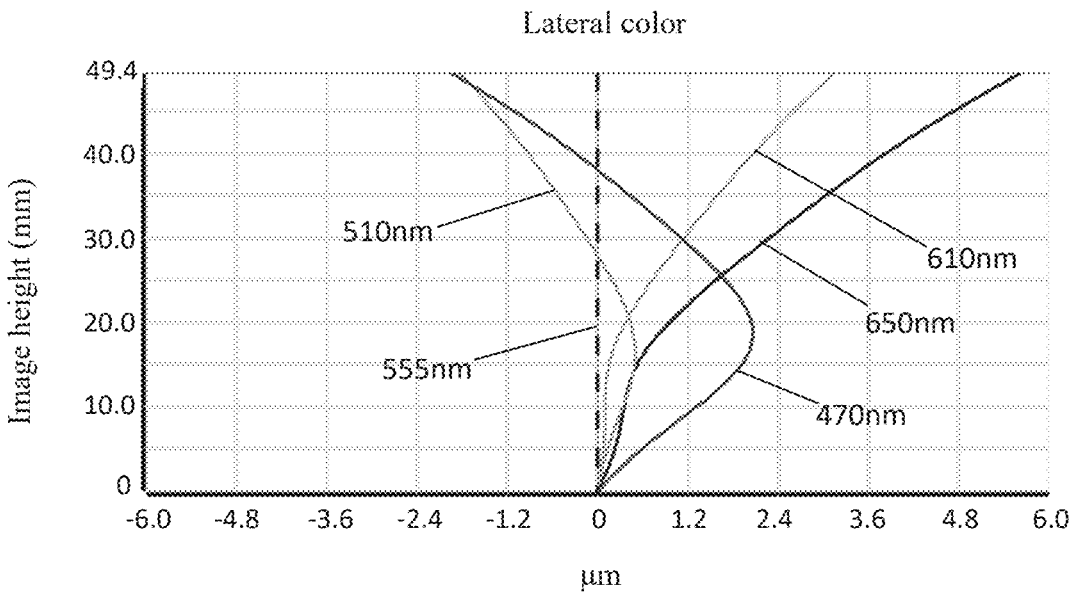
FIG. 11 is a schematic diagram of the lateral color of the camera optical lens shown in FIG. 9.
Figure 12:
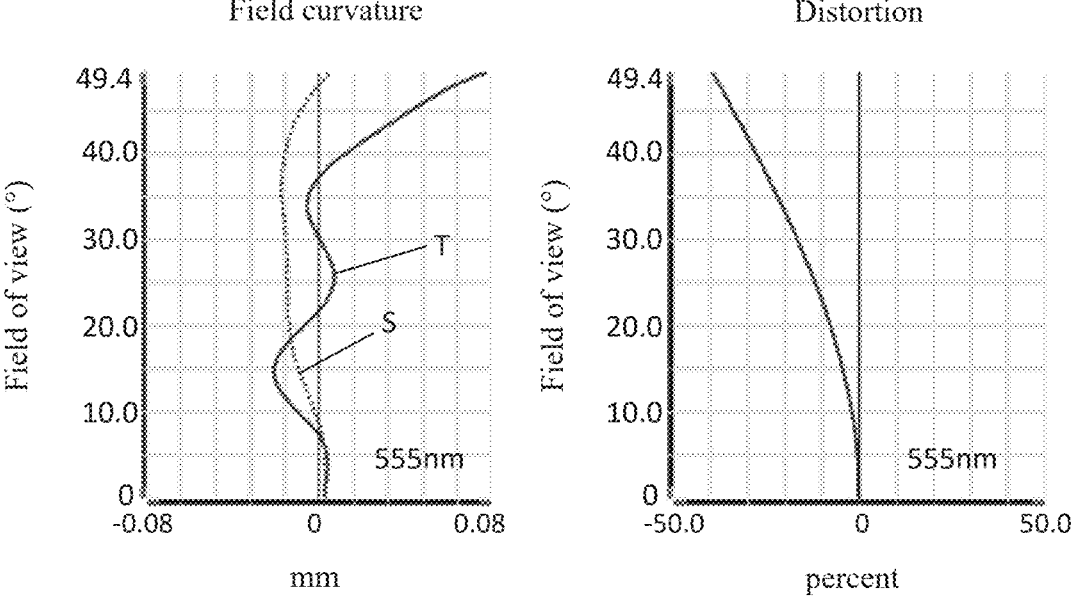
FIG. 12 is a schematic diagram of the field curvature and distortion of the camera optical lens shown in FIG. 9.

FIG. 10 and FIG. 11 show a longitudinal aberration and a lateral color of light with wavelengths of 650 nm, 610 nm, 555 nm, 510 nm and 470 nm after passing the camera optical lens 30 in Embodiment 3. FIG. 12 illustrates a schematic diagram of a field curvature and a distortion of light with a wavelength of 555 nm after passing the camera optical lens 30 in Embodiment 3. A field curvature S in FIG. 12 is a field curvature in a sagittal direction, and T is a field curvature in a tangential direction.

In this embodiment, an entrance pupil diameter (ENPD) of the camera optical lens 30 is 4.255 mm, an image height (IH) of 1.0H is 4.950 mm, and a field of view (FOV) in a diagonal direction is 98.88°. Thus, the camera optical lens 30 meets the design requirement for large aperture, wide angle and ultra-thinness. Its on-axis and off-axis chromatic aberrations are sufficiently corrected, thereby achieving excellent optical performance.

Embodiment 4

The meaning of symbols of Embodiment 4 is the same as that of Embodiment 1.

Figure 13:
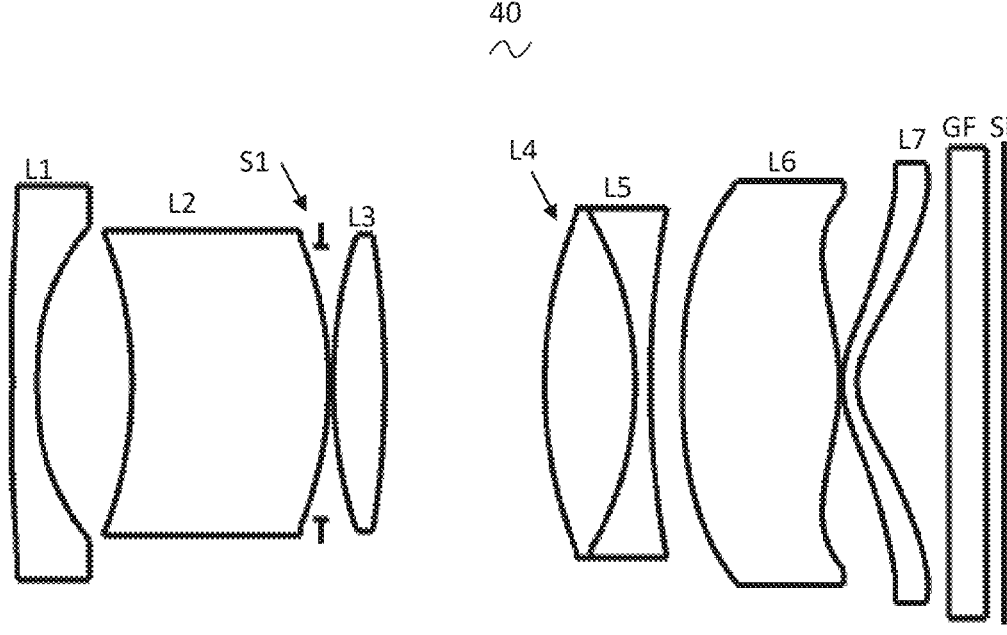
FIG. 13 is a schematic structural diagram of a camera optical lens of a fourth embodiment of the present disclosure.

FIG. 13 shows a camera optical lens 40 in Embodiment 4 of the present disclosure. The second lens L2 has a positive refractive power.

Table 7 and Table 8 show design data of the camera optical lens 40 in Embodiment 4 of the present disclosure.

TABLE 7

| | R | d | | nd | | vd |
|---|---|---|---|---|---|---|
| S1 | ∞ | d0= | −7.457 | | | |
| R1 | −22.268 | d1= | 0.608 | nd1 | 1.7738 | v1 47.17 |
| R2 | 9.873 | d2= | 2.293 | | | |
| R3 | −8.701 | d3= | 4.743 | nd2 | 1.4970 | v2 81.59 |
| R4 | −7.870 | d4= | 0.113 | | | |
| R5 | 10.088 | d5= | 1.236 | nd3 | 1.6131 | v3 60.61 |
| R6 | −19.402 | d6= | 3.861 | | | |
| R7 | 9.613 | d7= | 2.188 | nd4 | 1.4970 | v4 81.59 |
| R8 | −7.000 | d8= | 0.000 | | | |
| R9 | −7.000 | d9= | 0.359 | nd5 | 1.7283 | v5 28.31 |
| R10 | 19.000 | d10= | 0.766 | | | |
| R11 | 12.925 | d11= | 3.800 | nd6 | 1.5831 | v6 59.46 |
| R12 | −3.718 | d12= | 0.077 | | | |
| R13 | 1.935 | d13= | 0.349 | nd7 | 1.8514 | v7 40.07 |

TABLE 7-continued

| | R | d | | nd | | vd |
|---|---|---|---|---|---|---|
| R14 | 1.342 | d14= | 2.214 | | | |
| R15 | ∞ | d15= | 0.900 | ndg | 1.5168 | vg 64.21 |
| R16 | ∞ | d16= | 0.440 | | | |

Table 8 shows aspherical surface data of each lens of the camera optical lens 40 in Embodiment 4 of the present disclosure.

TABLE 8

| | Conic coefficient | Aspheric surface coefficients | | | | |
|---|---|---|---|---|---|---|
| | k | A4 | A6 | A8 | A10 | A12 |
| R1 | −2.7192E+02 | 6.9260E−03 | −1.0232E−03 | 9.1912E−05 | −5.5738E−06 | 2.0963E−07 |
| R2 | −6.4343E−01 | 1.0645E−02 | −9.3412E−04 | −3.0629E−05 | 2.2082E−05 | −2.9537E−06 |
| R11 | 5.2736E+00 | 8.0103E−04 | −3.1745E−04 | 6.1228E−06 | −3.8238E−07 | 4.6893E−09 |
| R12 | −1.7724E+01 | −2.5498E−04 | 2.3686E−04 | −3.1754E−06 | 2.1222E−07 | −1.3147E−08 |
| R13 | −3.2658E+00 | −8.6377E−03 | 7.0067E−04 | −3.6621E−05 | 1.6002E−06 | −5.0348E−08 |
| R14 | −2.8060E+00 | −7.0854E−03 | 5.7252E−04 | −3.2595E−05 | 1.4011E−06 | −3.8503E−08 |

| | Conic coefficient | Aspheric surface coefficients | |
|---|---|---|---|
| | k | A14 | A16 |
| R1 | −2.7192E+02 | −4.1211E−09 | 2.8390E−11 |
| R2 | −6.4343E−01 | 1.8306E−07 | −4.4630E−09 |
| R11 | 5.2736E+00 | 2.9269E−10 | −8.8562E−12 |
| R12 | −1.7724E+01 | 7.1440E−11 | 2.2249E−12 |
| R13 | −3.2658E+00 | 6.7640E−10 | −4.8045E−13 |
| R14 | −2.8060E+00 | 2.9401E−10 | 4.8272E−12 |

Figure 14:
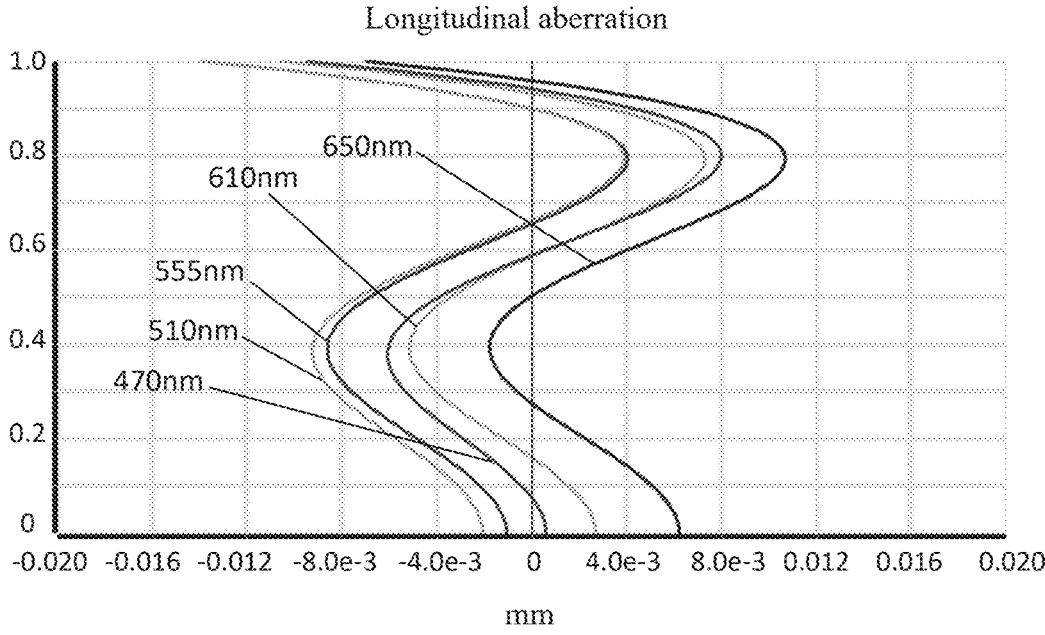
FIG. 14 is a schematic diagram of the longitudinal aberration of the camera optical lens shown in FIG. 13.
Figure 15:
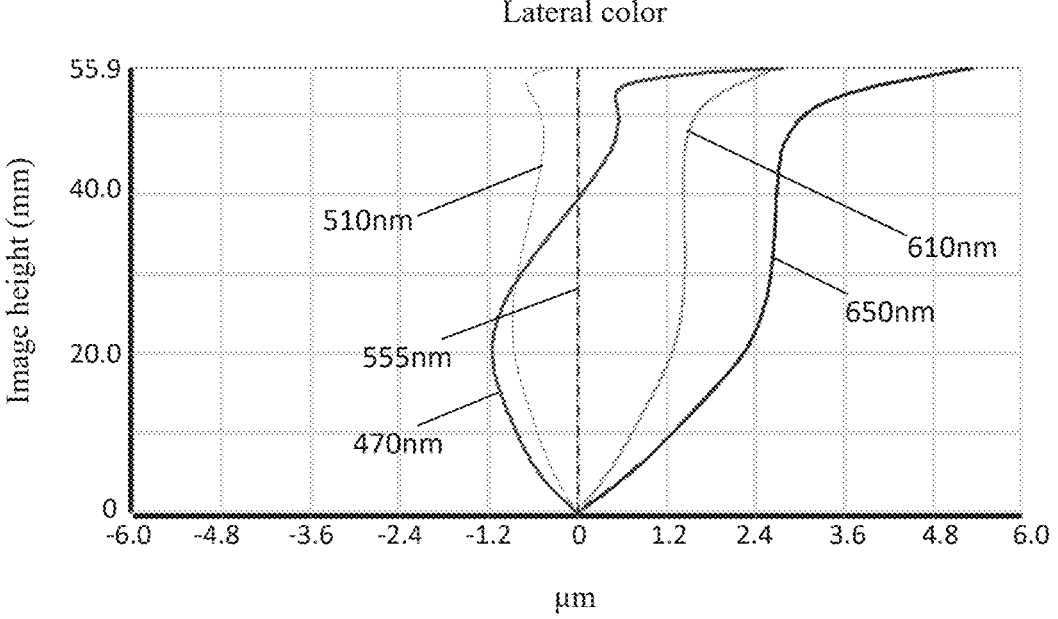
FIG. 15 is a schematic diagram of the lateral color of the camera optical lens shown in FIG. 13.
Figure 16:
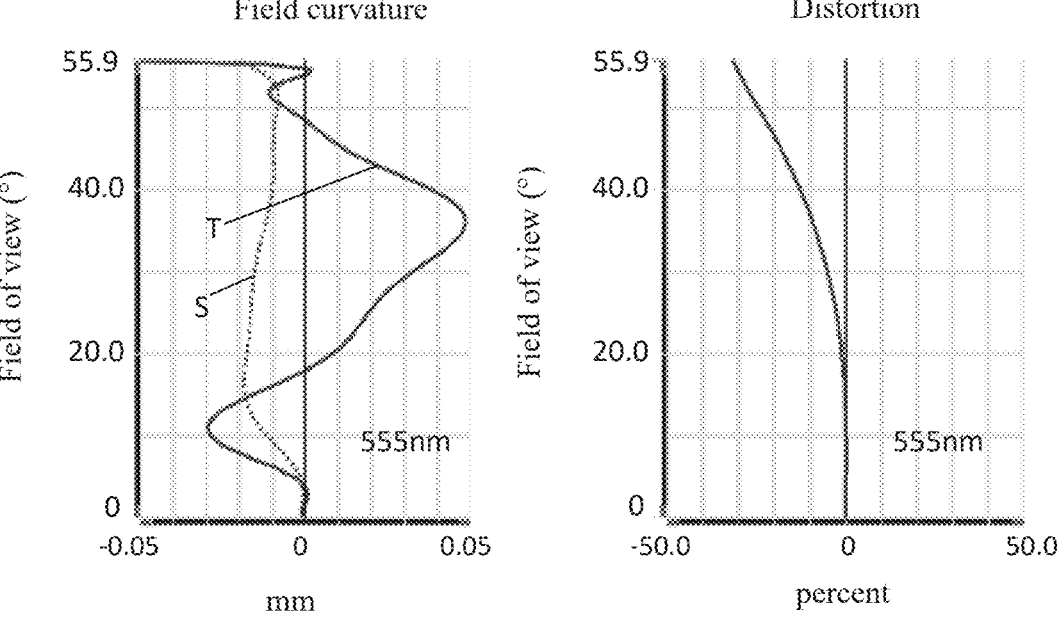
FIG. 16 is a schematic diagram of the field curvature and distortion of the camera optical lens shown in FIG. 13.

FIG. 14 and FIG. 15 show a longitudinal aberration and a lateral color of light with wavelengths of 650 nm, 610 nm, 555 nm, 510 nm and 470 nm after passing the camera optical lens 40 in Embodiment 4. FIG. 16 illustrates a schematic diagram of a field curvature and a distortion of light with a wavelength of 555 nm after passing the camera optical lens 40 in Embodiment 4. A field curvature S in FIG. 16 is a field curvature in a sagittal direction, and T is a field curvature in a tangential direction.

In this embodiment, an entrance pupil diameter (ENPD) of the camera optical lens 40 is 3.236 mm, an image height (IH) of 1.0H is 5.390 mm, and a field of view (FOV) in a diagonal direction is 111.74°. Thus, the camera optical lens 40 meets the design requirement for large aperture, wide angle and ultra-thinness. Its on-axis and off-axis chromatic aberrations are sufficiently corrected, thereby achieving excellent optical performance.

Embodiment 5

The meaning of symbols of Embodiment 5 is the same as that of Embodiment 1.

Figure 17:
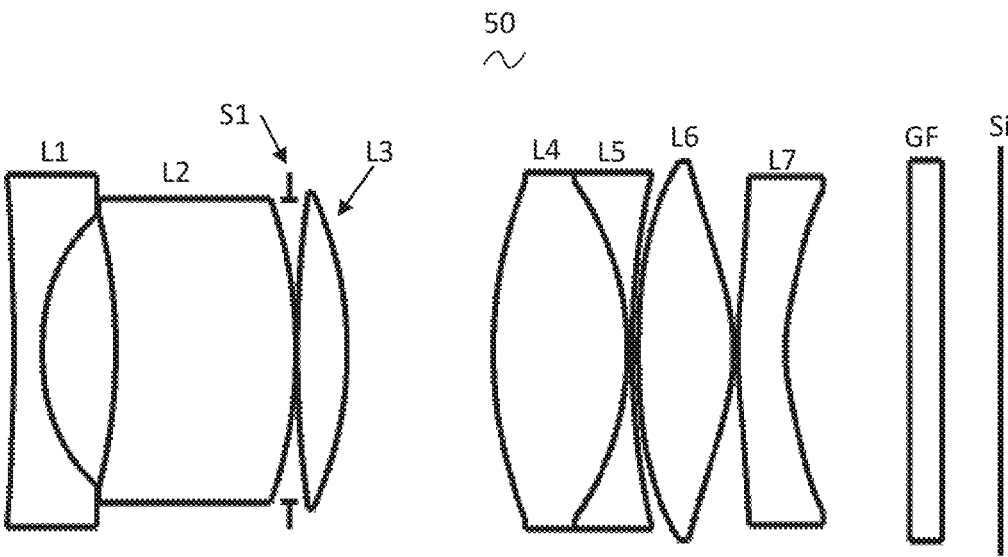
FIG. 17 is a schematic structural diagram of a camera optical lens of a fifth embodiment of the present disclosure.

FIG. 17 shows a camera optical lens 50 in Embodiment 5 of the present disclosure. The second lens L2 has a positive refractive power.

Table 9 and Table 10 show design data of the camera optical lens 50 in Embodiment 5 of the present disclosure.

TABLE 9

| | R | | d | nd | | vd | |
|---|---|---|---|---|---|---|---|
| S1 | ∞ | d0= | −7.421 | | | | |
| R1 | −16.261 | d1= | 0.760 | nd1 | 1.7738 | v1 | 47.17 |
| R2 | 6.870 | d2= | 1.971 | | | | |
| R3 | −13.315 | d3= | 4.871 | nd2 | 1.4970 | v2 | 81.59 |
| R4 | −10.891 | d4= | 0.038 | | | | |
| R5 | 26.516 | d5= | 1.345 | nd3 | 1.6131 | v3 | 60.61 |
| R6 | −8.902 | d6= | 3.955 | | | | |
| R7 | 10.841 | d7= | 3.610 | nd4 | 1.5101 | v4 | 63.36 |
| R8 | −7.000 | d8= | 0.000 | | | | |
| R9 | −7.000 | d9= | 0.137 | nd5 | 1.7283 | v5 | 28.31 |
| R10 | 19.000 | d10= | 0.168 | | | | |
| R11 | 18.974 | d11= | 2.566 | nd6 | 1.5831 | v6 | 59.46 |
| R12 | −4.872 | d12= | 0.110 | | | | |
| R13 | 9.092 | d13= | 1.294 | nd7 | 1.8514 | v7 | 40.07 |
| R14 | 4.350 | d14= | 3.350 | | | | |
| R15 | ∞ | d15= | 0.900 | ndg | 1.5168 | vg | 64.21 |
| R16 | ∞ | d16= | 1.574 | | | | |

Table 10 shows aspherical surface data of each lens of the camera optical lens 50 in Embodiment 5 of the present disclosure.

TABLE 10

| | Conic coefficient | Aspheric surface coefficients | | | | |
|---|---|---|---|---|---|---|
| | k | A4 | A6 | A8 | A10 | A12 |
| R1 | 5.6698E+00 | 6.4659E−03 | −9.4668E−04 | 9.1422E−05 | −5.6693E−06 | 2.0972E−07 |
| R2 | −7.3809E+00 | 1.0869E−02 | −6.8429E−04 | −4.5316E−05 | 2.2737E−05 | −2.9082E−06 |
| R11 | 4.1397E+00 | 1.5291E−03 | −9.6824E−05 | 7.0373E−06 | −3.0574E−07 | 8.4299E−09 |
| R12 | −4.8815E+00 | 7.2136E−04 | −1.4165E−05 | −1.2791E−06 | 2.3763E−07 | −1.2215E−08 |
| R13 | 8.9244E−01 | −6.8073E−03 | 6.1860E−04 | −4.5687E−05 | 2.4238E−06 | −7.7822E−08 |
| R14 | −7.0584E+00 | −3.9637E−03 | 5.2172E−04 | −3.7358E−05 | 1.7589E−06 | −2.9893E−08 |

| | Conic coefficient | Aspheric surface coefficients | |
|---|---|---|---|
| | k | A14 | A16 |
| R1 | 5.6698E+00 | −4.0040E−09 | 2.7340E−11 |
| R2 | −7.3809E+00 | 1.7348E−07 | −4.1382E−09 |

TABLE 10-continued

| | | | |
|---|---|---|---|
| R11 | 4.1397E+00 | -1.4736E-10 | 1.1642E-12 |
| R12 | -4.8815E+00 | 2.1304E-10 | -4.8378E-13 |
| R13 | 8.9244E-01 | 1.0452E-09 | 1.0308E-12 |
| R14 | -7.0584E+00 | -7.5326E-10 | 2.8962E-11 |

Figure 18:
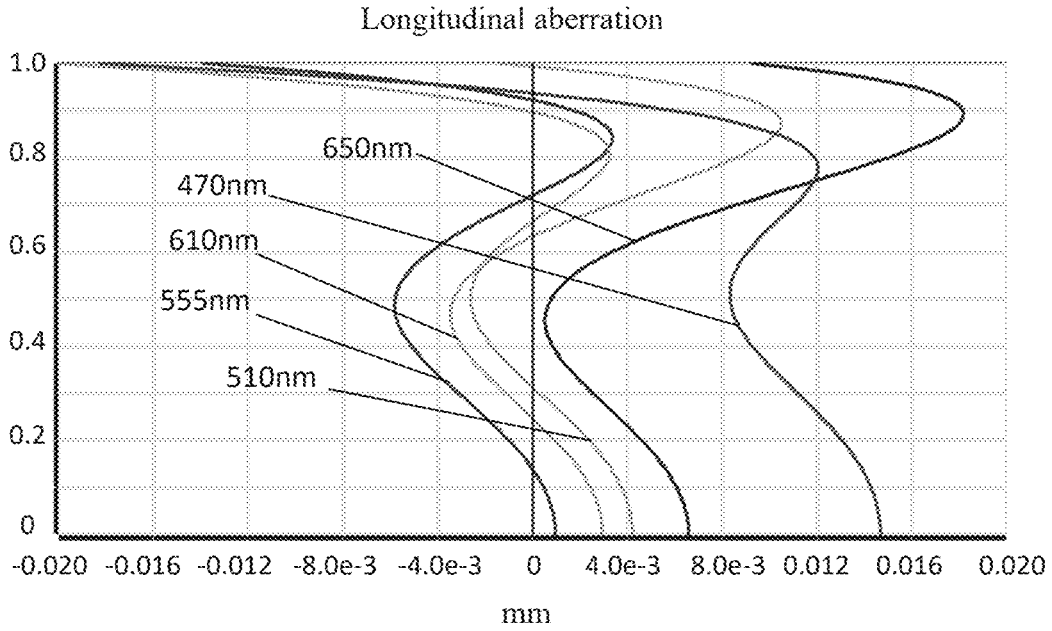
FIG. 18 is a schematic diagram of the longitudinal aberration of the camera optical lens shown in FIG. 17.
Figure 19:
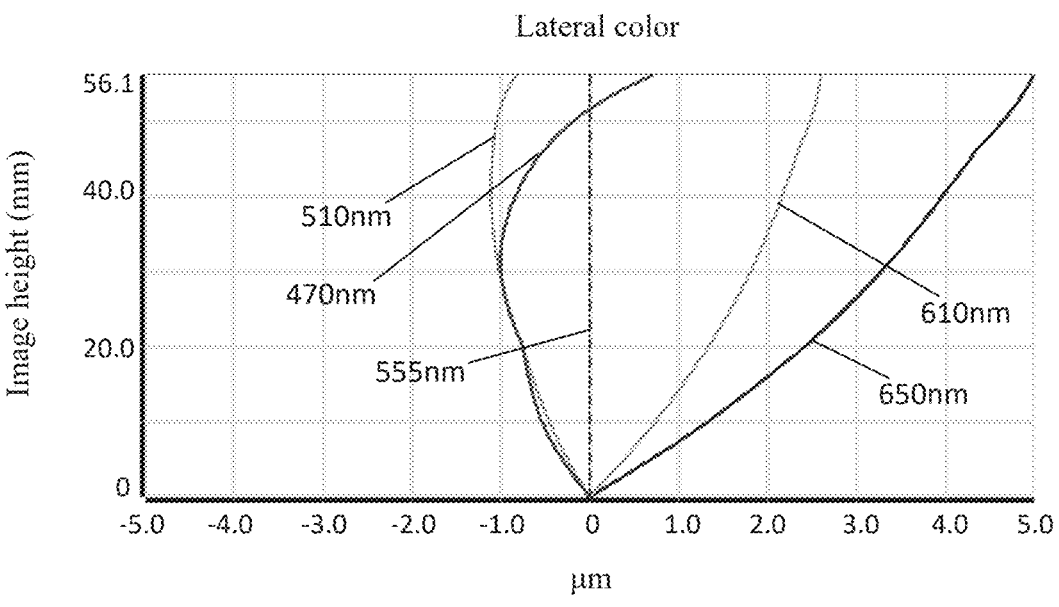
FIG. 19 is a schematic diagram of the lateral color of the camera optical lens shown in FIG. 17.
Figure 20:
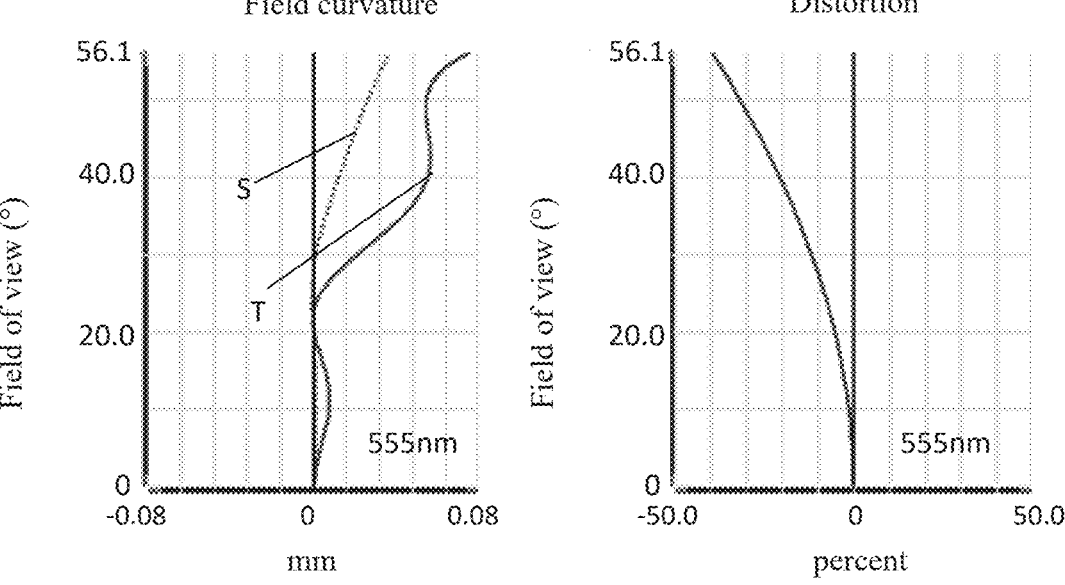
FIG. 20 is a schematic diagram of the field curvature and distortion of the camera optical lens shown in FIG. 17.

FIG. 18 and FIG. 19 show a longitudinal aberration and a lateral color of light with wavelengths of 650 nm, 610 nm, 555 nm, 510 nm and 470 nm after passing the camera optical lens 40 in Embodiment 5. FIG. 20 illustrates a schematic diagram of a field curvature and a distortion of light with a wavelength of 555 nm after passing the camera optical lens 50 in Embodiment 5. A field curvature S in FIG. 20 is a field curvature in a sagittal direction, and T is a field curvature in a tangential direction.

In this embodiment, an entrance pupil diameter (ENPD) of the camera optical lens 50 is 3.448 mm, an image height (IH) of 1.0H is 5.110 mm, and a field of view (FOV) in a diagonal direction is 112.26°. Thus, the camera optical lens 50 meets the design requirement for large aperture, wide angle and ultra-thinness. Its on-axis and off-axis chromatic aberrations are sufficiently corrected, thereby achieving excellent optical performance.

TABLE 11

| | R | d | | nd | | vd |
|---|---|---|---|---|---|---|
| S1 | ∞ | d0= | -7.108 | | | |
| R1 | -23.367 | d1= | 0.896 | nd1 | 1.7738 | v1 47.17 |
| R2 | 12.886 | d2= | 2.364 | | | |
| R3 | -5.808 | d3= | 4.563 | nd2 | 1.4970 | v2 81.59 |
| R4 | -7.683 | d4= | 0.493 | | | |
| R5 | 11.386 | d5= | 3.241 | nd3 | 1.6131 | v3 60.61 |
| R6 | -18.807 | d6= | 1.633 | | | |
| R7 | 10.027 | d7= | 5.907 | nd4 | 1.4970 | v4 81.59 |
| R8 | -7.000 | d8= | 0.000 | | | |
| R9 | -7.000 | d9= | 0.162 | nd5 | 1.7283 | v5 28.31 |
| R10 | 19.000 | d10= | 0.124 | | | |
| R11 | 24.806 | d11= | 2.989 | nd6 | 1.5831 | v6 59.46 |
| R12 | -5.547 | d12= | 0.053 | | | |
| R13 | 4.802 | d13= | 1.062 | nd7 | 1.8514 | v7 40.07 |
| R14 | 2.929 | d14= | 2.416 | | | |
| R15 | ∞ | d15= | 0.900 | ndg | 1.5168 | vg 64.21 |
| R16 | ∞ | d16= | 0.641 | | | |

Table 12 shows aspherical surface data of each lens of the camera optical lens 60 in Comparative Embodiment of the present disclosure.

TABLE 12

| | Conic coefficient | Aspheric surface coefficients | | | | |
|---|---|---|---|---|---|---|
| | k | A4 | A6 | A8 | A10 | A12 |
| R1 | -4.7385E+01 | 7.4702E-03 | -9.7146E-04 | 9.0745E-05 | -5.6103E-06 | 2.1114E-07 |
| R2 | -2.0943E+01 | 1.1135E-02 | -7.9966E-04 | -4.1650E-05 | 2.3135E-05 | -2.9473E-06 |
| R11 | -8.0759E+01 | 1.0367E-03 | -8.5443E-05 | 5.5987E-06 | -1.7741E-07 | 4.8118E-09 |
| R12 | -4.2041E+00 | 1.7069E-03 | -3.2650E-05 | -1.1058E-06 | 3.2326E-07 | -1.0667E-08 |
| R13 | -8.2112E-01 | -6.8960E-03 | 5.2943E-04 | -3.6530E-05 | 1.7793E-06 | -4.6268E-08 |
| R14 | -3.1519E+00 | -3.9913E-03 | 4.0472E-04 | -3.0534E-05 | 1.4760E-06 | -3.7311E-08 |

| | Conic coefficient k | Aspheric surface coefficients | |
|---|---|---|---|
| | | A14 | A16 |
| R1 | -4.7385E+01 | -4.1976E-09 | 3.1864E-11 |
| R2 | -2.0943E+01 | 1.7777E-07 | -4.0571E-09 |
| R11 | -8.0759E+01 | -4.9060E-11 | 1.1546E-12 |
| R12 | -4.2041E+00 | 1.6901E-10 | 1.4007E-14 |
| R13 | -8.2112E-01 | 5.5543E-10 | -2.6612E-12 |
| R14 | -3.1519E+00 | 3.4195E-10 | 2.2186E-12 |

Comparative Embodiment

The meaning of symbols of Comparative Embodiment is the same as that of Embodiment 1.

Figure 21:
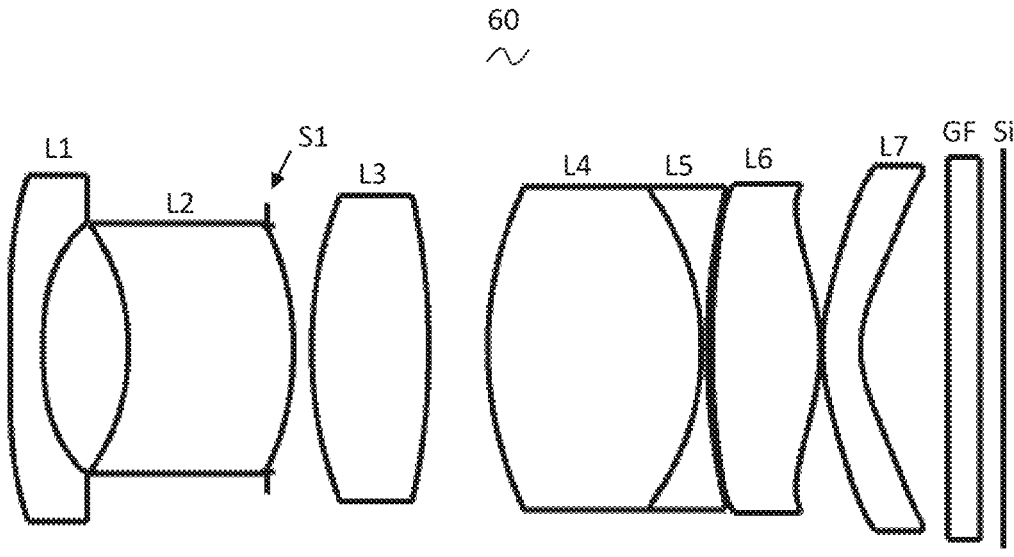
FIG. 21 is a schematic structural diagram of a camera optical lens in a comparative embodiment.

FIG. 21 shows a camera optical lens 60 in Comparative Embodiment of the present disclosure.

Table 11 and Table 12 show design data of the camera optical lens 60 in Comparative Embodiment of the present disclosure.

Figure 22:
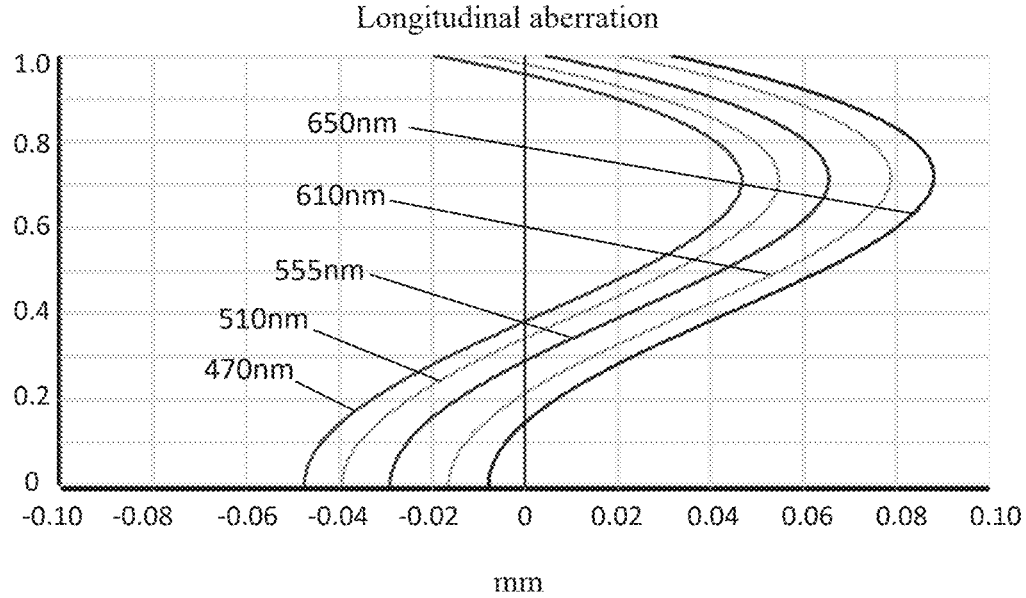
FIG. 22 is a schematic diagram of the longitudinal aberration of the camera optical lens shown in FIG. 21.
Figure 23:
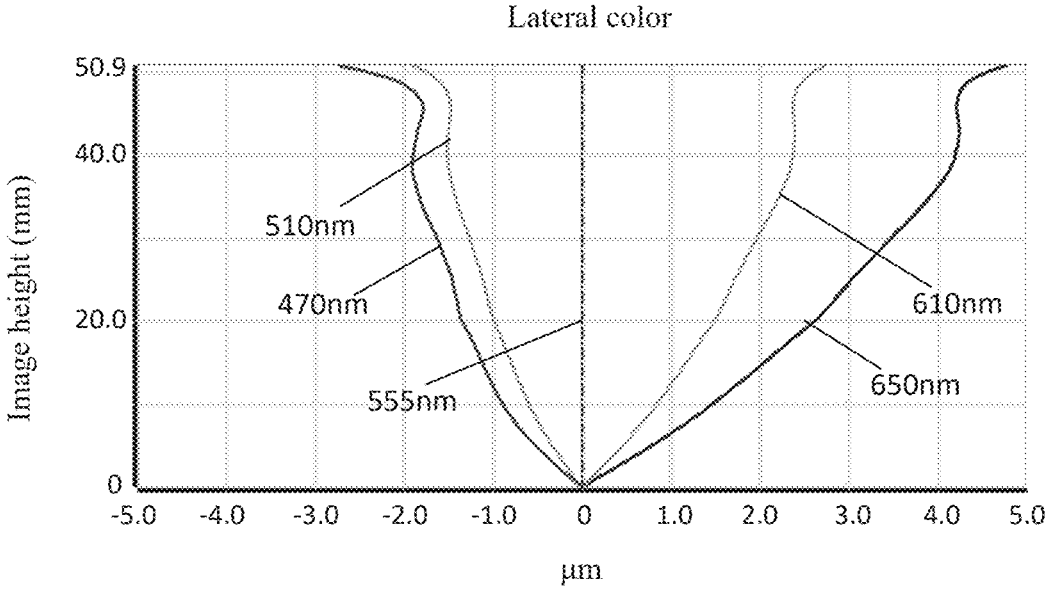
FIG. 23 is a schematic diagram of the lateral color of the camera optical lens shown in FIG. 21.
Figure 24:
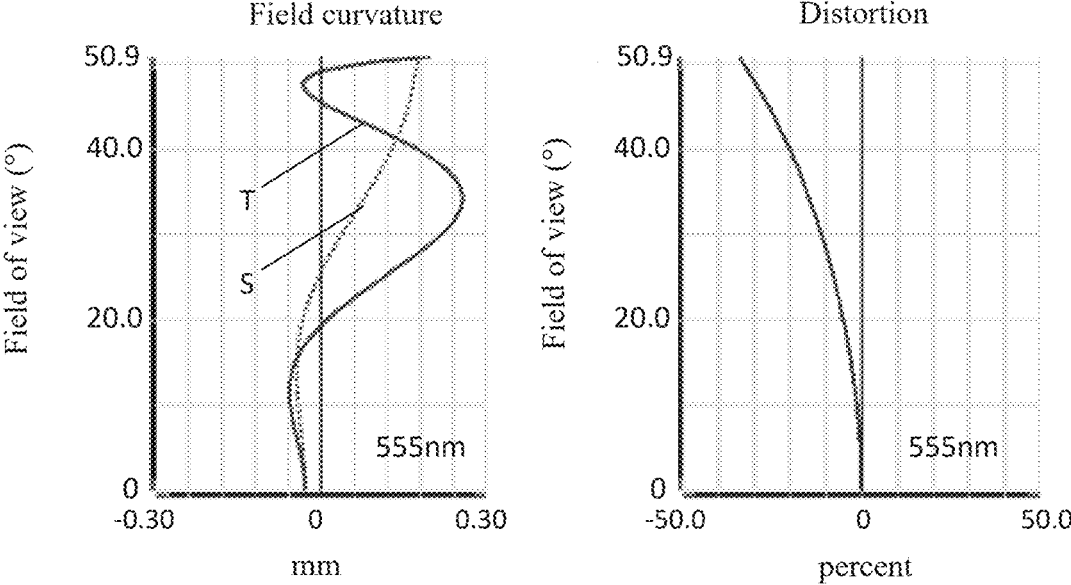
FIG. 24 is a schematic diagram of the field curvature and distortion of the camera optical lens shown in FIG. 21.

FIG. 22 and FIG. 23 show a longitudinal aberration and a lateral color of light with wavelengths of 650 nm, 610 nm, 555 nm, 510 nm and 470 nm after passing the camera optical lens 60 in Comparative Embodiment. FIG. 24 illustrates a schematic diagram of a field curvature and a distortion of light with a wavelength of 555 nm after passing the camera optical lens 60 in Comparative Embodiment. A field curvature S in FIG. 24 is a field curvature in a sagittal direction, and T is a field curvature in a tangential direction.

Table 13 in the following shows values corresponding to various conditions according to the aforementioned conditions in Comparative Embodiment. Apparently, the camera optical lens 60 in Comparative Embodiment does not satisfy the aforementioned condition: -1.70≤f1/f≤-1.10, so that the imaging performance is poor.

In Comparative Embodiment, an entrance pupil diameter (ENPD) of the camera optical lens 60 is 3.625 mm, an image height (IH) of 1.0H is 4.840 mm, and a field of view (FOV) in a diagonal direction is 101.70°. Thus, the camera optical lens 60 meets the design requirement for large aperture, wide angle and ultra-thinness. Its on-axis and off-axis chromatic aberrations are sufficiently corrected, thereby achieving excellent optical performance.

TABLE 13

| Parameters and conditions | Embodiment 1 | Embodiment 2 | Embodiment 3 | Embodiment 4 | Embodiment 5 | Comparative Embodiment |
|---|---|---|---|---|---|---|
| (R1 + R2)/ (R1 − R2) | 0.138 | 0.500 | 0.000 | 0.386 | 0.406 | 0.289 |
| (FOV*f)/IH | 123.358 | 129.416 | 139.890 | 110.413 | 124.670 | 129.476 |
| f1/f | −1.410 | −1.693 | −1.110 | −1.640 | −1.080 | −1.773 |
| R5/R6 | −0.938 | −0.619 | −0.502 | −0.520 | −2.979 | −0.605 |
| f | 6.234 | 6.231 | 7.003 | 5.326 | 5.675 | 5.965 |
| f1 | −8.793 | −10.547 | −7.773 | −8.734 | −6.130 | −10.578 |
| f2 | −187.901 | 107.639 | −307.978 | 57.115 | 72.011 | −250.627 |
| f3 | 12.323 | 10.465 | 13.775 | 10.968 | 10.996 | 12.024 |
| f4 | 9.715 | 7.764 | 9.158 | 8.505 | 8.926 | 9.355 |
| f5 | −6.923 | −6.875 | −6.939 | −6.939 | −6.964 | −6.961 |
| f6 | 9.100 | 10.583 | 9.954 | 5.391 | 6.902 | 8.042 |
| f7 | −25.536 | −10.343 | −33.345 | −7.016 | −11.152 | −11.890 |
| FNO | 1.646 | 1.646 | 1.646 | 1.646 | 1.646 | 1.646 |
| TTL | 29.953 | 24.430 | 30.606 | 23.947 | 26.649 | 27.444 |

It will be understood by those of ordinary skills in the art that the embodiments described above are specific embodiments realizing the present disclosure. In practice, various changes may be made to these embodiments in form and in detail without departing from the spirit and scope of the disclosure.

What is claimed is:

1. A camera optical lens comprising, from an object side to an image side in sequence: a first lens having a negative refractive power, a second lens having a refractive power, a third lens having a positive refractive power, a fourth lens having a positive refractive power, a fifth lens having a negative refractive power, a sixth lens having a positive refractive power, and a seventh lens having a negative refractive power;

wherein the camera optical lens satisfies following conditions: $0 \le (R1+R2)/(R1-R2) \le 0.50$; $110.00 \le (FOV*f)/IH \le 140.00$; $-1.70 \le f1/f \le -1.10$; and $-3.00 \le R5/R6 \le -0.50$;

where R1 denotes a central curvature radius of an object-side surface of the first lens; R2 denotes a central curvature radius of an image-side surface of the first lens; FOV denotes a field of view in a diagonal direction of the camera optical lens; IH denotes an image height of 1.0H of the camera optical lens; f denotes a focal length of the camera optical lens; f1 denotes a focal length of the first lens; R5 denotes a central curvature radius of an object-side surface of the third lens; and R6 denotes a central curvature radius of an image-side surface of the third lens.

2. The camera optical lens according to claim 1, wherein the camera optical lens further satisfies the following condition: $0.13 \le BFL/TTL \le 0.22$;

where BFL denotes an on-axis distance from the seventh lens to an image surface; and TTL denotes a total track length of the camera optical lens.

3. The camera optical lens according to claim 1, wherein the fourth lens and the fifth lens are glued together.

4. The camera optical lens according to claim 3, wherein the camera optical lens further satisfies the following condition: $v4-v5 \ge 35.00$;

where v4 denotes an abbe number of the fourth lens; and v5 denotes an abbe number of the fifth lens.

5. The camera optical lens according to claim 1, wherein the object-side surface of the first lens is concave in a paraxial region, the image-side surface of the first lens is concave in the paraxial region, and the camera optical lens further satisfies the following condition: $0.01 \le d1/TTL \le 0.04$;

where TTL denotes a total track length of the camera optical lens; and d1 denotes an on-axis thickness of the first lens.

6. The camera optical lens according to claim 1, wherein an object-side surface of the second lens is concave in a paraxial region, an image-side surface of the second lens is convex in the paraxial region, and the camera optical lens further satisfies following conditions: $-87.96 \le f2/f \le 25.91$; $-51.10 \le (R3+R4)/(R3-R4) \le 29.91$; and $0.05 \le d3/TTL \le 0.30$;

where f2 denotes a focal length of the second lens; R3 denotes a central curvature radius of the object-side surface of the second lens; R4 denotes a central curvature radius of the image-side surface of the second lens; d3 denotes an on-axis thickness of the second lens; and TTL denotes a total track length of the camera optical lens.

7. The camera optical lens according to claim 1, wherein the object-side surface of the third lens is convex in a paraxial region, the image-side surface of the third lens is convex in the paraxial region, and the camera optical lens further satisfies following conditions: $0.84 \le \beta/f \le 3.09$; $-0.66 \le (R5+R6)/(R5-R6) \le 0.75$; and $0.03 \le d5/TTL \le 0.28$;

where f3 denotes a focal length of the third lens; d5 denotes an on-axis thickness of the third lens; and TTL denotes a total track length of the camera optical lens.

8. The camera optical lens according to claim 1, wherein an object-side surface of the fourth lens is convex in a paraxial region, an image-side surface of the fourth lens is convex in the paraxial region, and the camera optical lens further satisfies following conditions: $0.62 \le f4/f \le 2.40$; $0.02 \le (R7+R8)/(R7-R8) \le 0.36$; and $0.05 \le d7/TTL \le 0.37$;

where f4 denotes a focal length of the fourth lens; R7 denotes a central curvature radius of the object-side surface of the fourth lens; R8 denotes a central curvature radius of the image-side surface of the fourth lens;

d7 denotes an on-axis thickness of the fourth lens; and TTL denotes a total track length of the camera optical lens.

9. The camera optical lens according to claim 1, wherein an object-side surface of the fifth lens is concave in a paraxial region, an image-side surface of the fifth lens is concave in the paraxial region, and the camera optical lens further satisfies following conditions: $-2.61 \leq f5/f \leq -0.66$; $-0.92 \leq (R9+R10)/(R9-R10) \leq -0.31$; and $0 \leq d9/TTL \leq 0.06$;

where f5 denotes a focal length of the fifth lens; R9 denotes a central curvature radius of the object-side surface of the fifth lens; R10 denotes a central curvature radius of the image-side surface of the fifth lens; d9 denotes an on-axis thickness of the fifth lens; and TTL denotes a total track length of the camera optical lens.

10. The camera optical lens according to claim 1, wherein an object-side surface of the sixth lens is convex in a paraxial region, an image-side surface of the sixth lens is convex in the paraxial region, and the camera optical lens further satisfies following conditions: $0.51 \leq f6/f \leq 2.55$; $0.02 \leq (R11+R12)/(R11-R12) \leq 1.50$; and $0.05 \leq d11/TTL \leq 0.24$;

where f6 denotes a focal length of the sixth lens; R11 denotes a central curvature radius of the object-side surface of the sixth lens; R12 denotes a central curvature radius of the image-side surface of the sixth lens; d11 denotes an on-axis thickness of the sixth lens; and TTL denotes a total track length of the camera optical lens.

11. The camera optical lens according to claim 1, wherein an object-side surface of the seventh lens is convex in a paraxial region, an image-side surface of the seventh lens is concave in the paraxial region, and the camera optical lens further satisfies following conditions: $-9.52 \leq f7/f \leq -0.88$; $1.42 \leq (R13+R14)/(R13-R14) \leq 14.31$; and $0.01 \leq d13/TTL \leq 0.07$;

where f7 denotes a focal length of the seventh lens; R13 denotes a central curvature radius of the object-side surface of the seventh lens; R14 denotes a central curvature radius of the image-side surface of the seventh lens; d13 denotes an on-axis thickness of the seventh lens; and TTL denotes a total track length of the camera optical lens.

12. The camera optical lens according to claim 1, wherein the first lens, the second lens, the third lens, the fourth lens, the fifth lens, the sixth lens and the seventh lens are all made of glass materials.

\*    \*    \*    \*    \*